May 13, 1958     F. A. DE WIESS     2,834,260
METHOD OF AND APPARATUS FOR MAKING CONTAINERS
Filed Nov. 19, 1954     22 Sheets-Sheet 1

INVENTOR.
FERDINAND A. DE WIESS
BY
ATTORNEYS.

May 13, 1958  F. A. DE WIESS  2,834,260
METHOD OF AND APPARATUS FOR MAKING CONTAINERS
Filed Nov. 19, 1954  22 Sheets-Sheet 3

INVENTOR.
FERDINAND A. DE WIESS
BY
ATTORNEYS.

May 13, 1958 F. A. DE WIESS 2,834,260
METHOD OF AND APPARATUS FOR MAKING CONTAINERS
Filed Nov. 19, 1954 22 Sheets-Sheet 4

INVENTOR.
FERDINAND A. DE WIESS
BY
ATTORNEYS

May 13, 1958 F. A. DE WIESS 2,834,260
METHOD OF AND APPARATUS FOR MAKING CONTAINERS
Filed Nov. 19, 1954 22 Sheets-Sheet 5
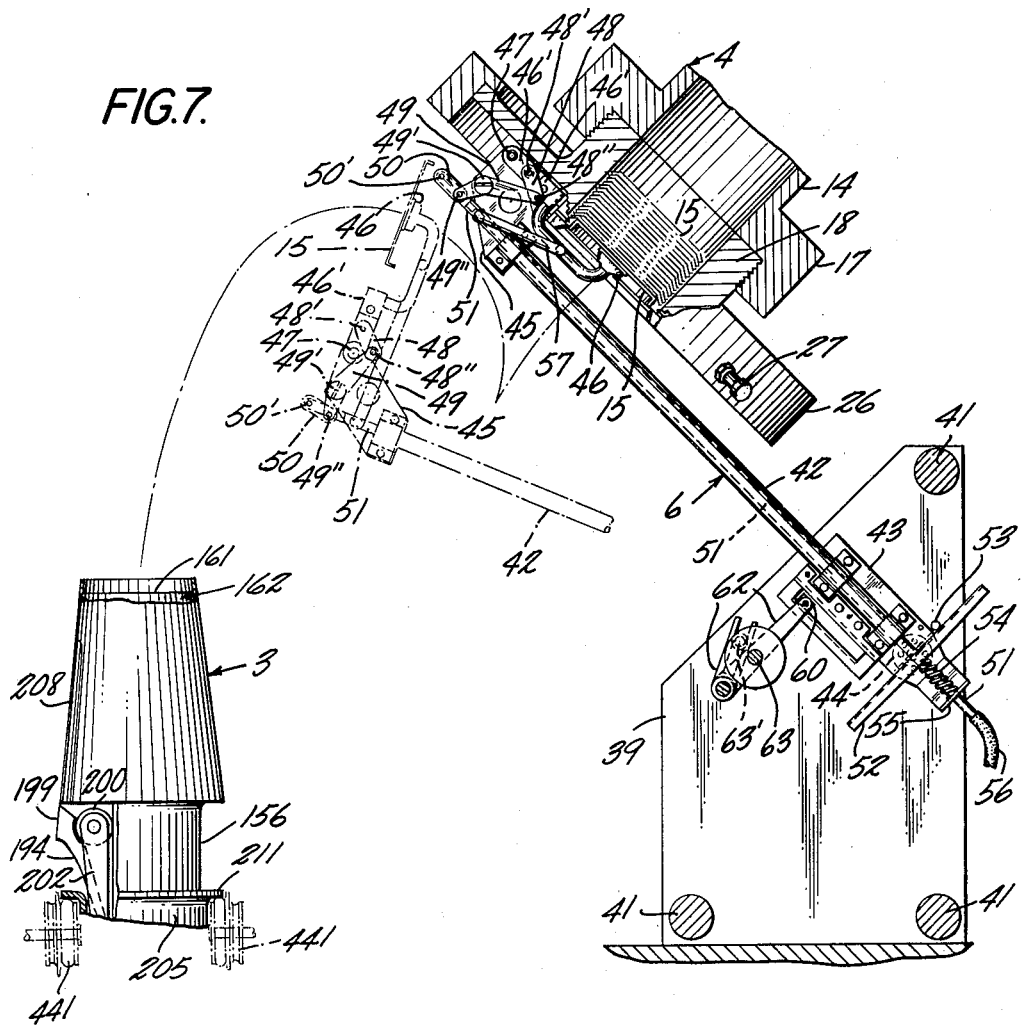
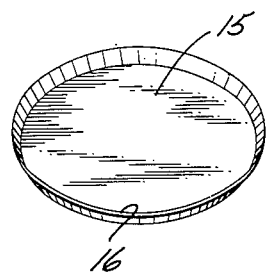
INVENTOR.
FERDINAND A. DE WIESS
BY
ATTORNEYS.

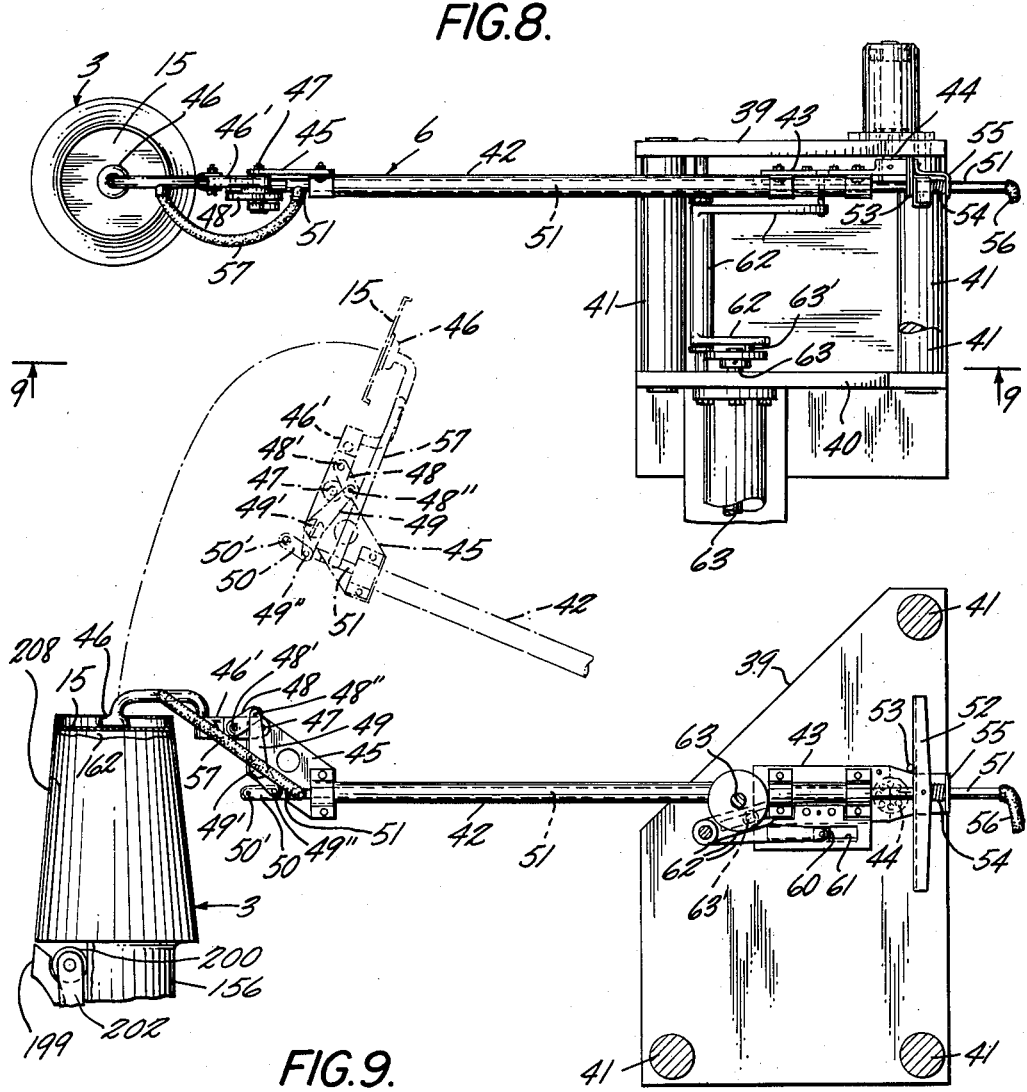

May 13, 1958 F. A. DE WIESS 2,834,260
METHOD OF AND APPARATUS FOR MAKING CONTAINERS
Filed Nov. 19, 1954 22 Sheets-Sheet 7
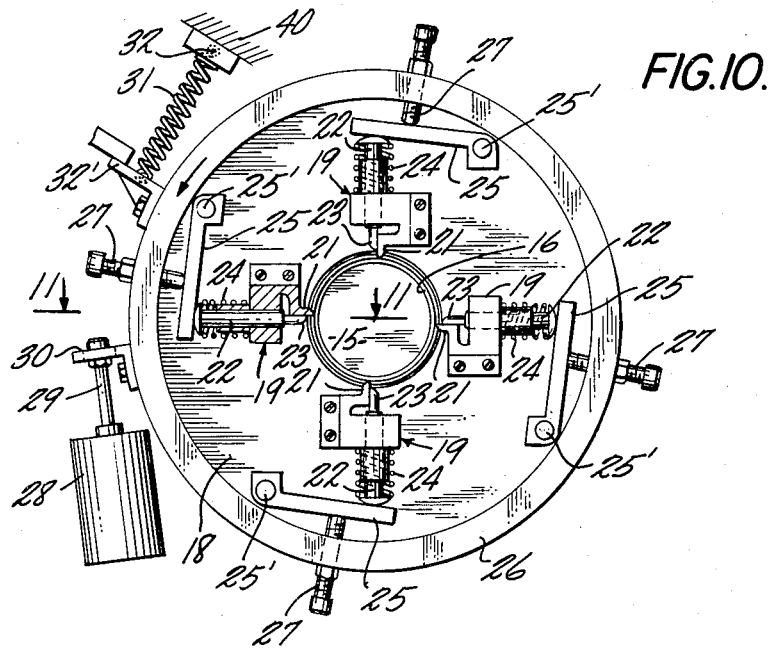
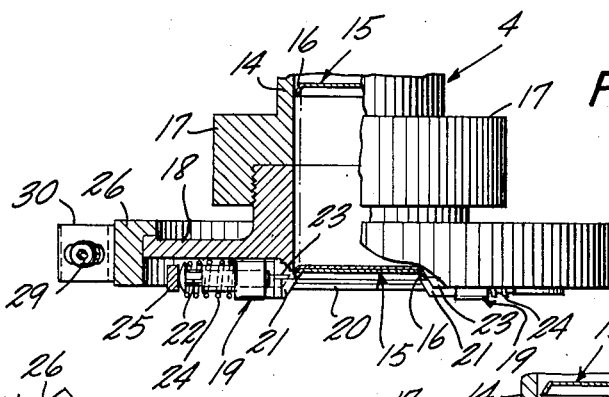
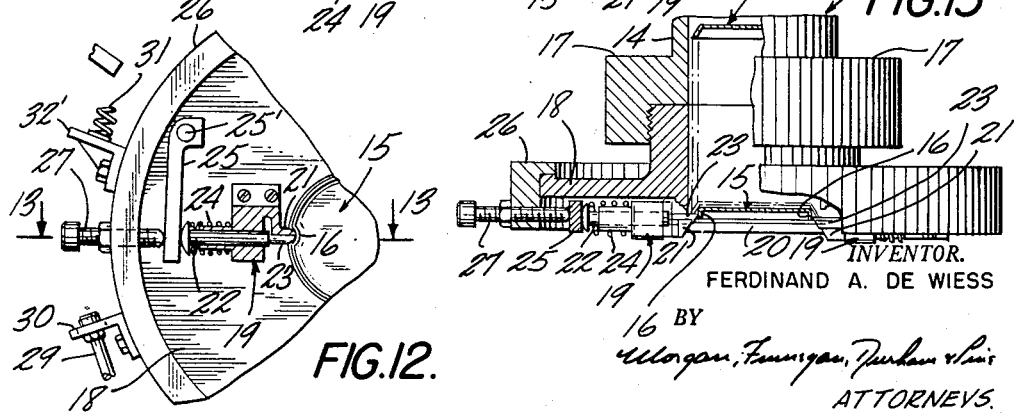
INVENTOR.
FERDINAND A. DE WIESS
BY
ATTORNEYS.

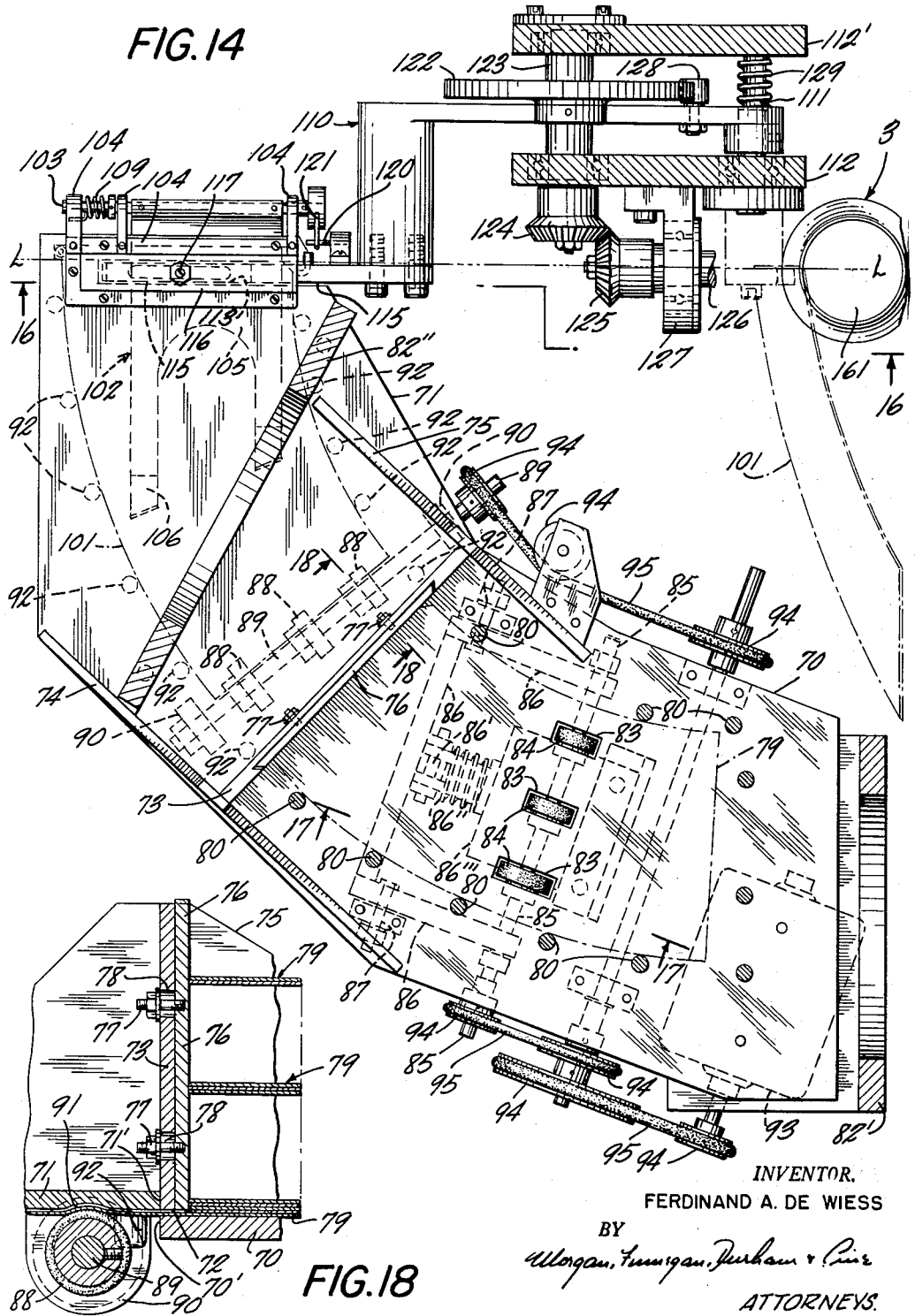

May 13, 1958     F. A. DE WIESS     2,834,260
METHOD OF AND APPARATUS FOR MAKING CONTAINERS
Filed Nov. 19, 1954     22 Sheets-Sheet 9

INVENTOR.
FERDINAND A. DE WIESS
BY
ATTORNEYS

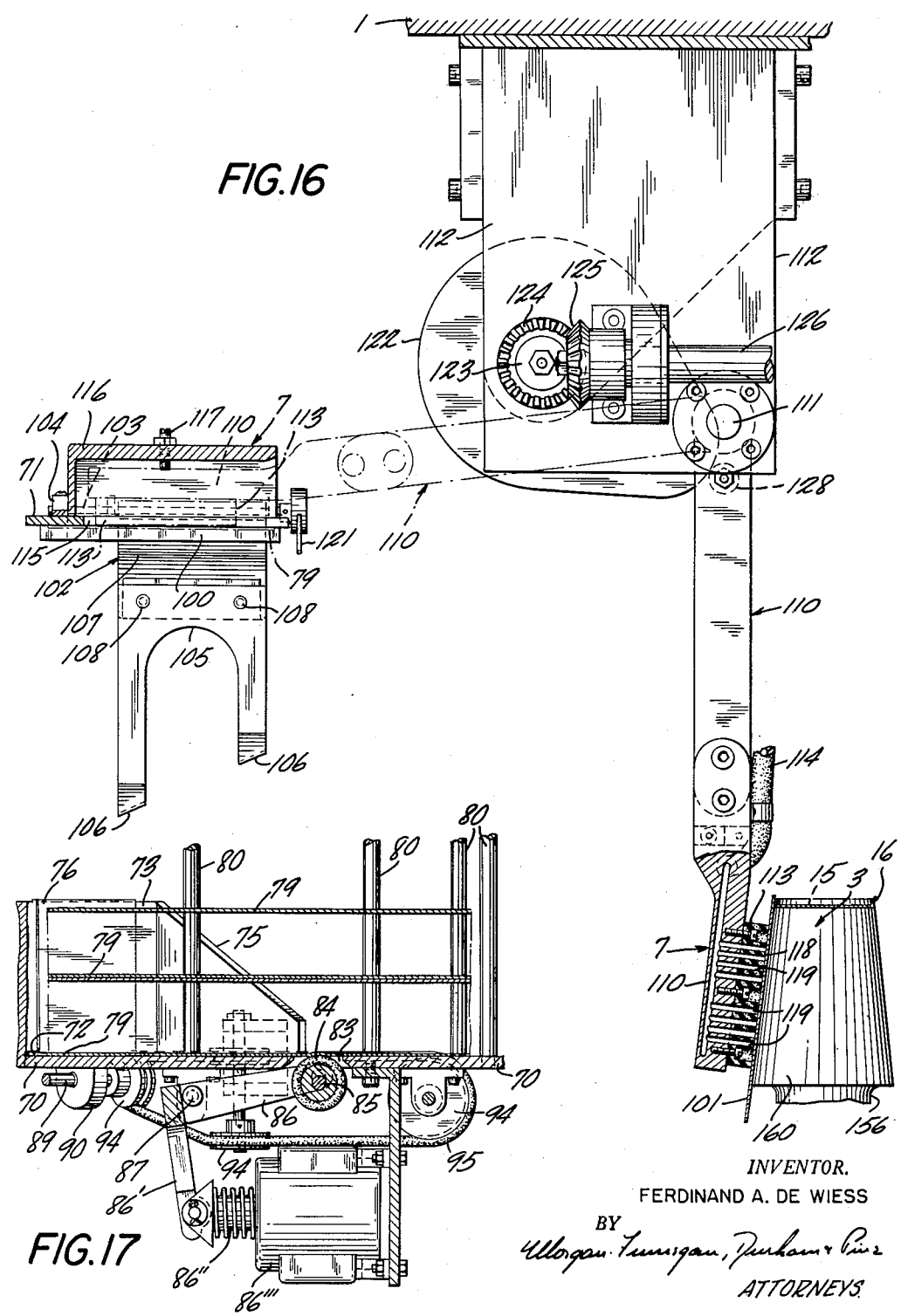

May 13, 1958 F. A. DE WIESS 2,834,260
METHOD OF AND APPARATUS FOR MAKING CONTAINERS
Filed Nov. 19, 1954 22 Sheets-Sheet 11

INVENTOR.
FERDINAND A. DE WIESS
BY
ATTORNEYS

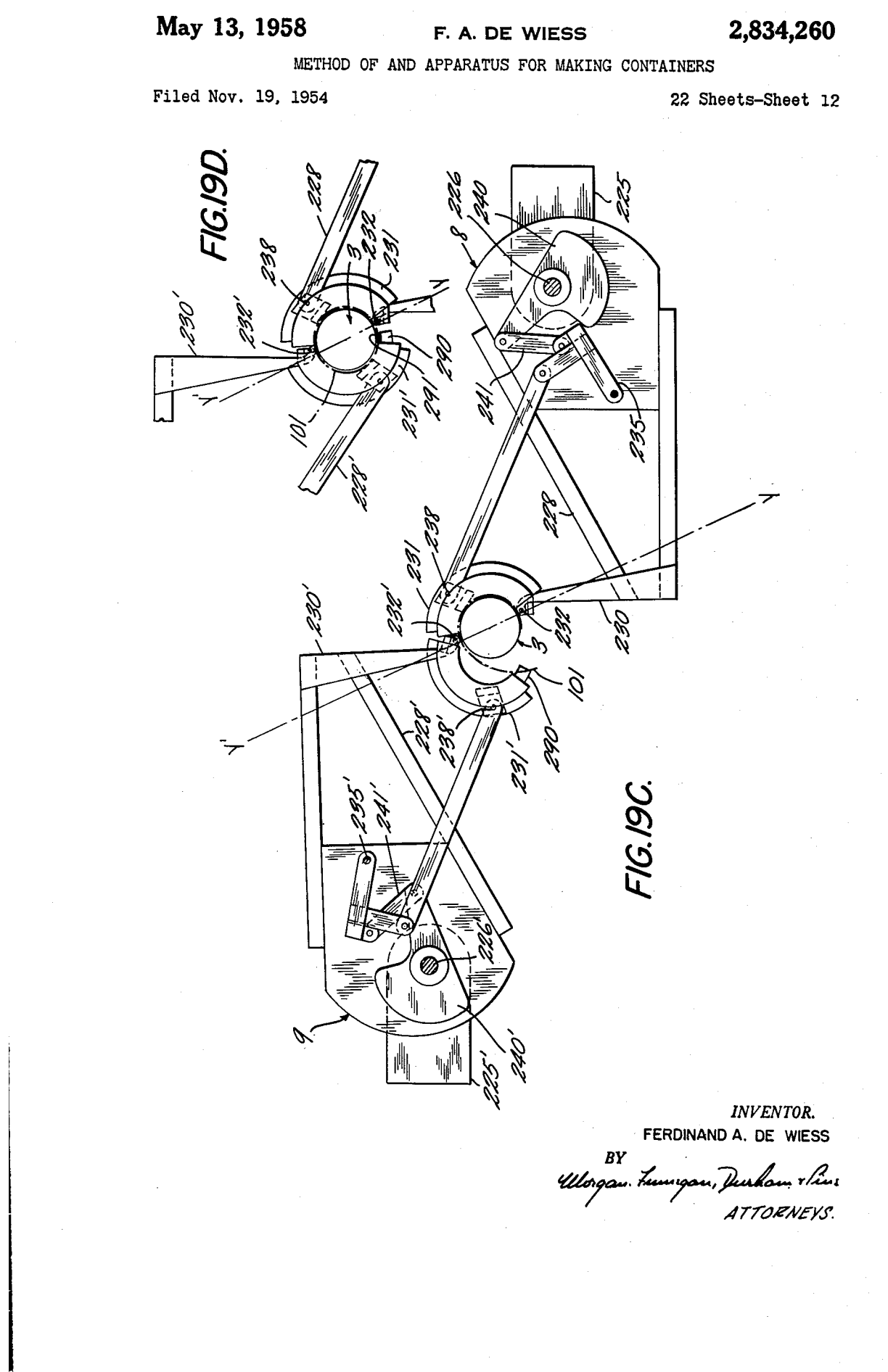

May 13, 1958 F. A. DE WIESS 2,834,260
METHOD OF AND APPARATUS FOR MAKING CONTAINERS
Filed Nov. 19, 1954 22 Sheets-Sheet 12

INVENTOR.
FERDINAND A. DE WIESS
BY
ATTORNEYS.

May 13, 1958 F. A. DE WIESS 2,834,260
METHOD OF AND APPARATUS FOR MAKING CONTAINERS
Filed Nov. 19, 1954 22 Sheets-Sheet 13
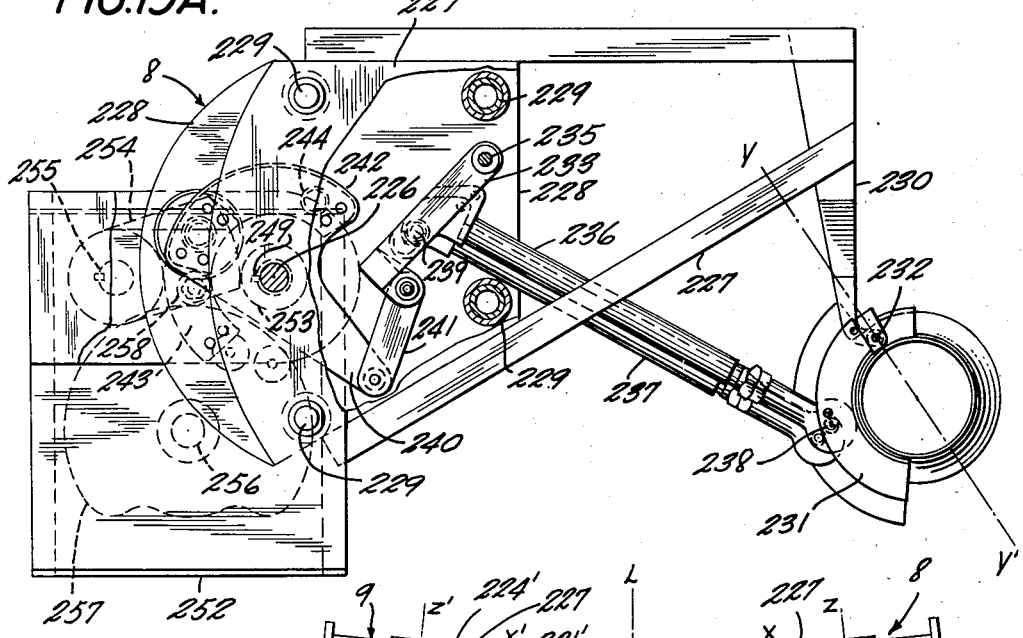
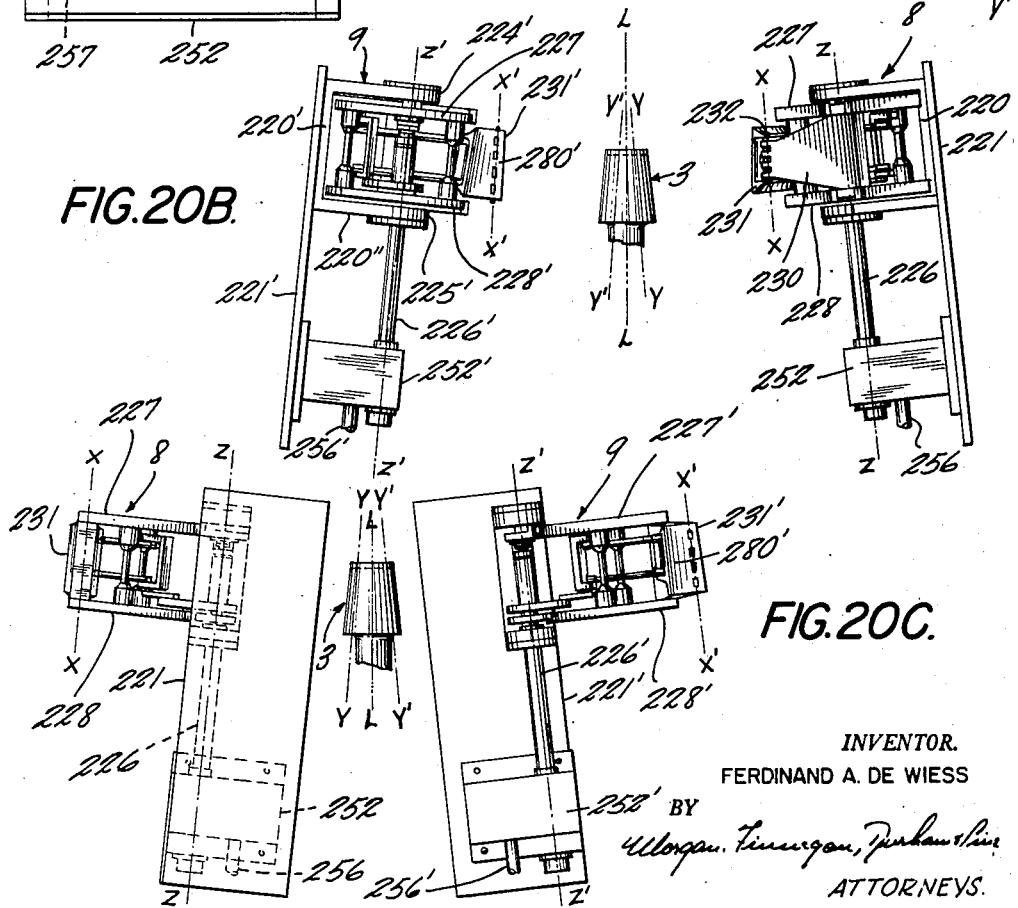
INVENTOR.
FERDINAND A. DE WIESS
ATTORNEYS.

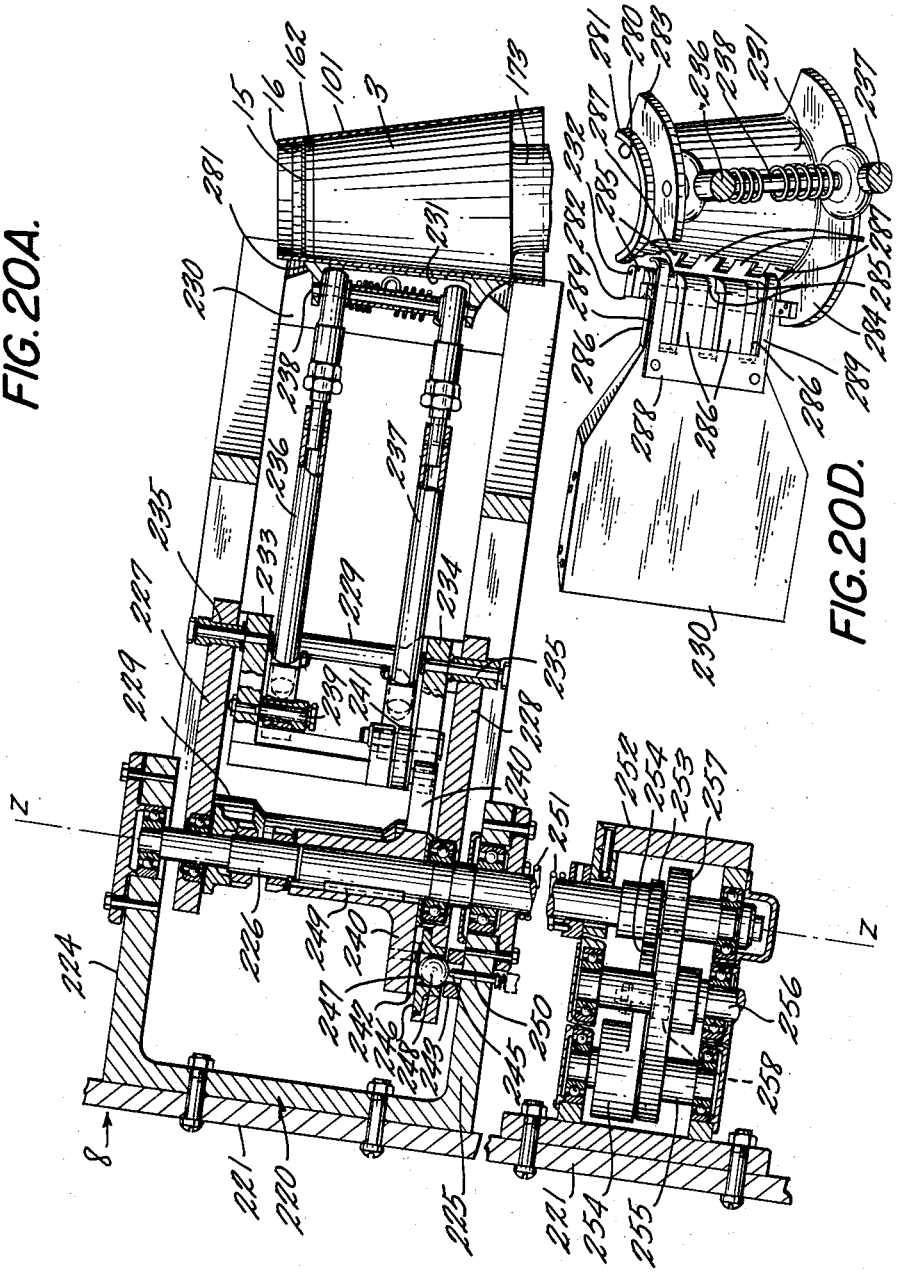

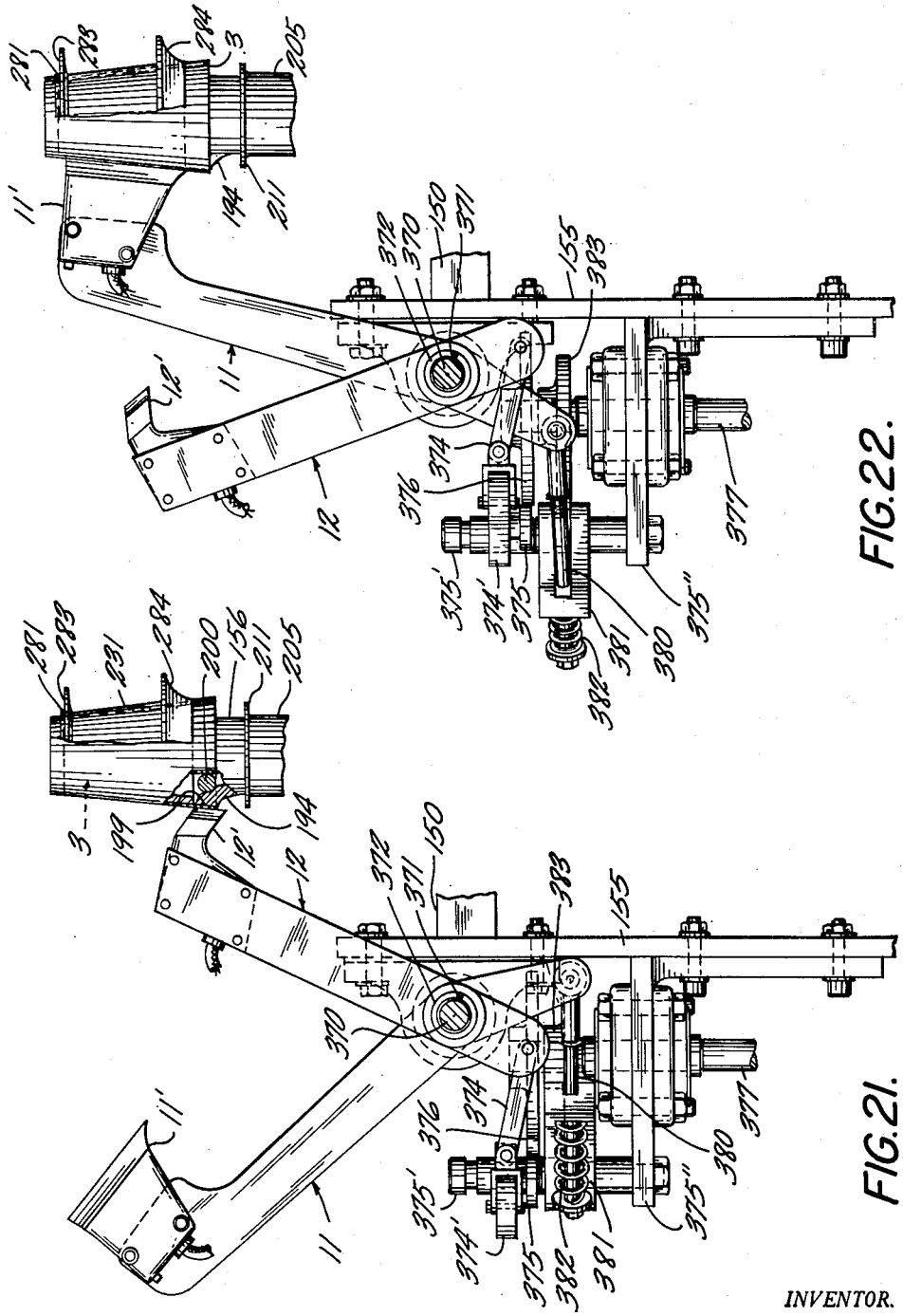

May 13, 1958   F. A. DE WIESS   2,834,260
METHOD OF AND APPARATUS FOR MAKING CONTAINERS
Filed Nov. 19, 1954   22 Sheets-Sheet 16

INVENTOR.
FERDINAND A. DE WIESS
BY
ATTORNEYS.

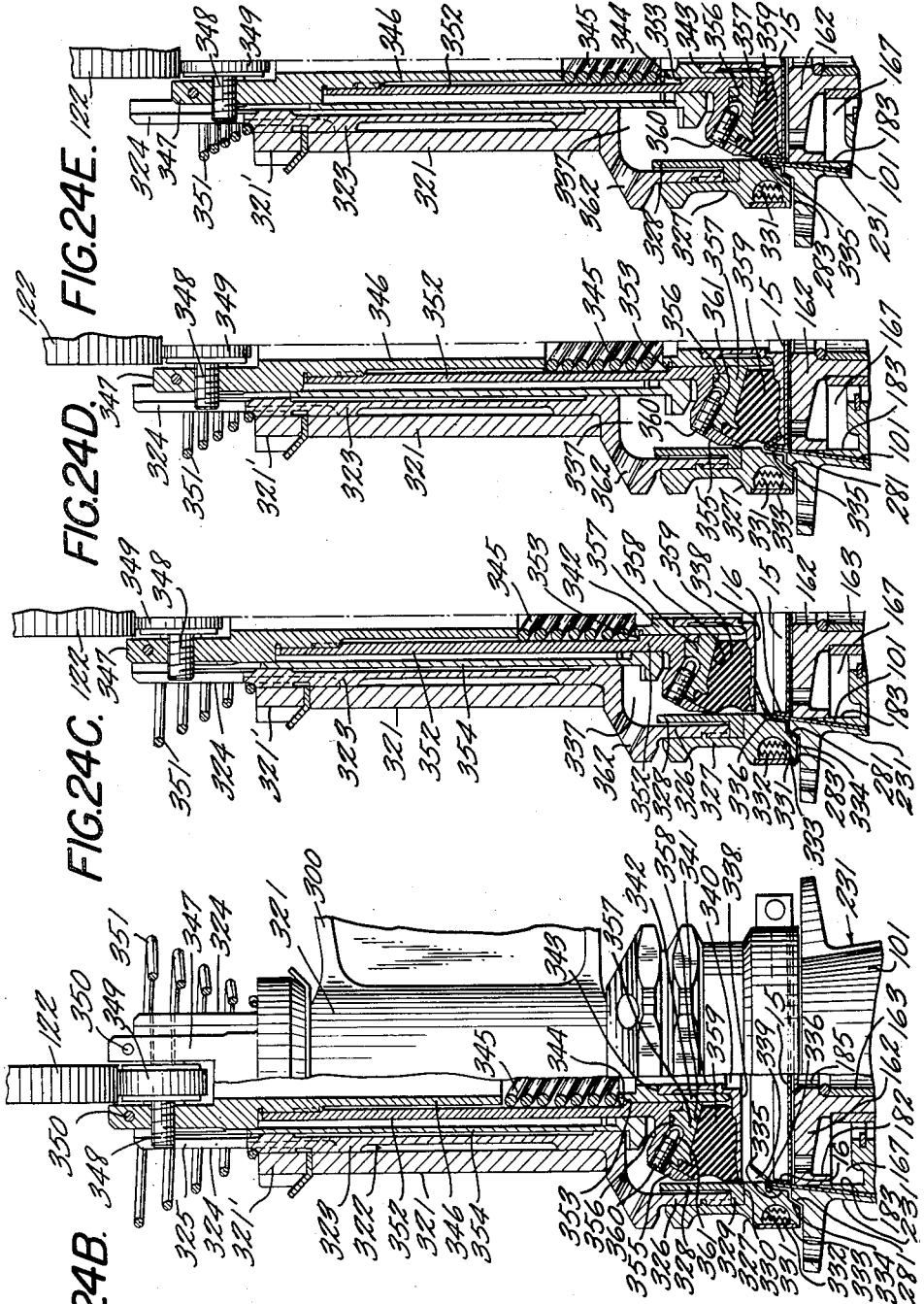

May 13, 1958 F. A. DE WIESS 2,834,260
METHOD OF AND APPARATUS FOR MAKING CONTAINERS
Filed Nov. 19, 1954 22 Sheets-Sheet 21

INVENTOR.
FERDINAND A. DE WIESS
BY
ATTORNEYS

May 13, 1958 F. A. DE WIESS 2,834,260
METHOD OF AND APPARATUS FOR MAKING CONTAINERS
Filed Nov. 19, 1954 22 Sheets-Sheet 22
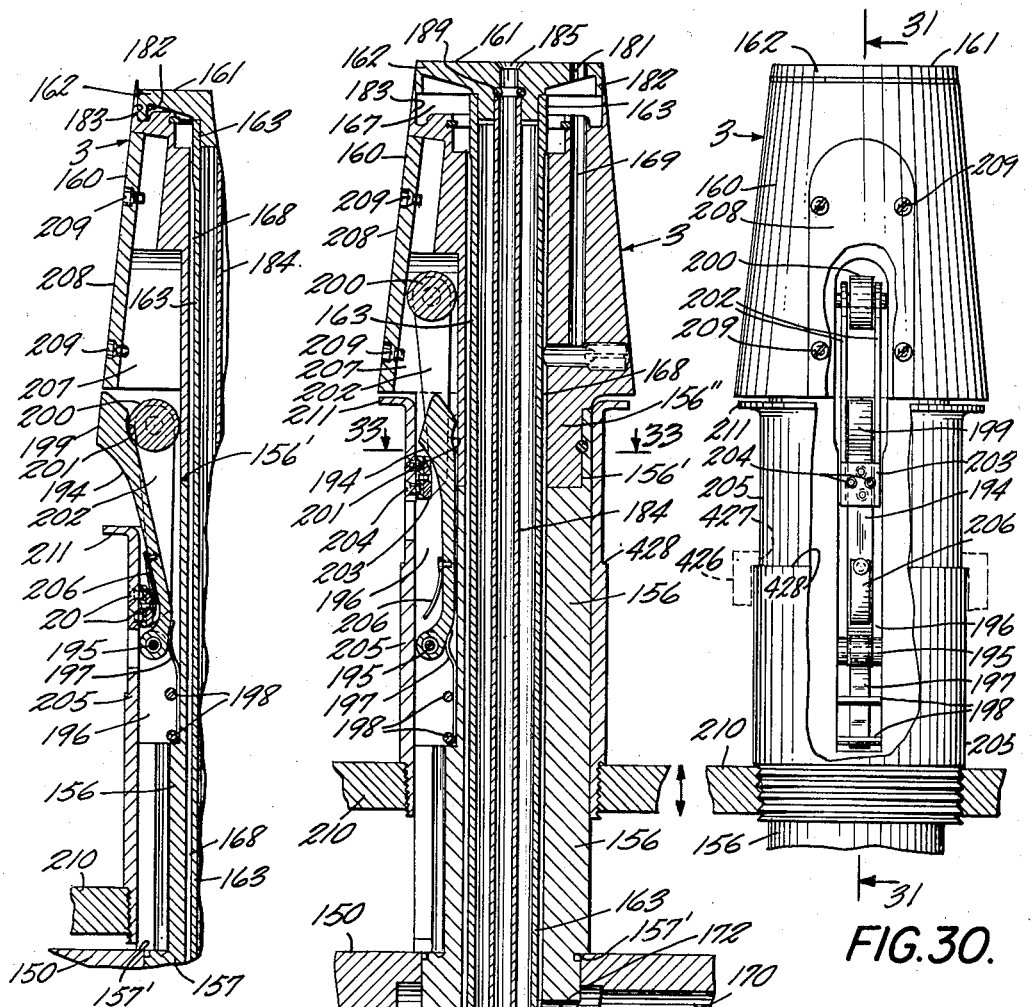
FIG.30.
FIG.31.
FIG.32.
FIG.33.
INVENTOR.
FERDINAND A. DE WIESS
BY
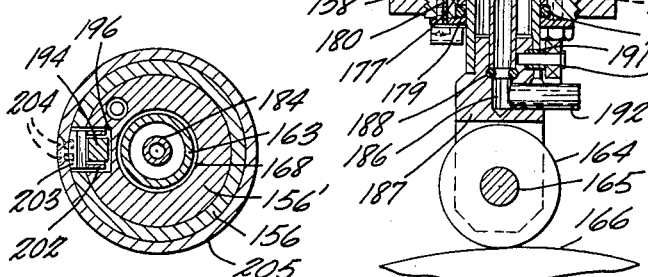
ATTORNEYS

United States Patent Office 2,834,260
Patented May 13, 1958

2,834,260

METHOD OF AND APPARATUS FOR MAKING CONTAINERS

Ferdinand A. de Wiess, Tuckahoe, N. Y., assignor to Rondo Development Corporation, New York, N. Y., a corporation of Delaware Application November 19, 1954, Serial No. 470,109

7 Claims. (Cl. 93—39.1)

This invention relates to methods and machines for the mass production from thin sheet material of thin-walled hollow bodies of utility especially as containers for liquid and relates more particularly to methods of and automatic machines for the mass production of paper cups.

Objects and advantages of the invention will be set forth in part hereinafter and in part will be obvious herefrom, or may be learned by practice with the invention, the same being realized and attained by means of the steps, combinations and improvements pointed out in the appended claims.

The invention consists in the novel steps, parts, constructions, arrangements, combinations and improvements herein shown and/or described.

The accompanying drawings, referred to herein and constituting a part hereof, illustrate an embodiment of apparatus for carrying out the method of the invention, and together with the description, serve to explain the principles of the invention.

In accordance with this invention, the cup-making machine in its preferred form consists basically of a combination of sub-assemblies working in inter-relation around a stationary rigid mandrel, each performing one of the following functions:

A. Storing and dispensing the pre-dished bottoms;
B. Feeding of one pre-dished bottom to the mandrel at each cycle;
C. Storing and dispensing wrapper blanks;
D. Feeding of one wrapper blank to the mandrel at each cycle;
E. Registering the bottom blank at a preliminary position on the mandrel, then receiving the wrapper blank and providing support while the wrapper blank is being moulded or formed to the final shape; moving the bottom blank into its final position and supporting the blanks while the operations of rim-rolling, bottom crimping and sealing are performed;
F. Spinning or rolling the upper rim of the cup;
G. Folding the lower rim of the wrapper blank over and into the rim of the dished bottom and crimping and sealing this seam by appropriate means employing pressure, or pressure and heat;
H. Sealing the side seam; and
I. Discharging the finished cup from the mandrel in order to complete the cycle.

Advantageously, the cups after they have come off the mandrel are collected, counted off to the predetermined required number and fed in stacks into packing tubes arranged in a shipping carton, each shipping carton after it has been filled being replaced with an empty one.

In accordance with this invention also, the several sub-assemblies aforesaid are, in general as follows:

A. A magazine is provided to receive the pre-dished bottoms, consisting of an inclined tube dimensioned in such a way that it will contain a stack of the pre-dished bottoms. If desired, on the upper opening a fitting, preferably provided with cutting knives, may be arranged in such a way that when a loaded shipping container is placed upon it, the knives may cut the end closure of the container thereby releasing its contents which slide by gravity into the magazine tube, thus loading it.

This magazine is provided on its lower end with a mechanical gate arrangement or stationary support against which the whole stack rests. At a given impulse, once at each cycle, a movable teeth move in, thereby pushing the rim of the lowest (or first) bottom blank off its support, thus releasing it so that it can be withdrawn by the transfer device and fed to the mandrel.

As the following bottom blank slides against the stationary support, only one blank can be released at each impulse.

B. A device is provided to transfer the bottom blanks from their magazine to the mandrel, preferably consisting of a mechanical linkage supporting and moving a vacuum gripper in such a way that it will grip a bottom blank at the point of its release from the magazine gating device, withdraw it from the gating device, move it through a composite curved path, thereby turning it upside down, and place it rim up in a central cavity provided on the top of the stationary mandrel located in the center of the working area. At this point the vacuum gripper is withdrawn from the working area and is moved back to the magazine for the next cycle.

C. As in the case of the bottom blank magazine, a wrapper blank magazine is provided consisting of a suitably disposed guide rack of appropriate shape, having, if desired, on its upper end, a device to receive and open a container of wrapper blanks thereby releasing and causing the automatic discharge of its contents into the magazine rack. The magazine is provided also with a gating arrangement at its lower end designed in such a way that the whole stack of wrapper blanks within its guides, rest against a flat plate. On one side of this plate a gating slot is provided, the aperture of which is slightly more than one—but considerably less—than two wrapper blank thicknesses.

At a given impulse, once every cycle, a unit of a friction drive reaching through the support plate contacts the first, or lowest wrapper blank resting on the plate and exerts a force on the blank in the direction of the gate slot sufficient to slide the blank out under the stack and through the gate. The dimensions of this gate prevent the second, or adjoining wrapper blank, from being dragged out with it.

When a given portion of the wrapper blank has appeared outside of the gating slot, it is gripped by another unit of the friction drive which keeps it moving along and against a flat plate, contacting the blank on the surface opposite to the one it was resting on before, until it is brought to a stop by registering with its leading edge against a bar. It is releasably held in this ready position by an elastic clamp which releases it after it has been gripped by the transfer device preparatory to being transferred at a given phase of the cycle to the stationary mandrel.

D. The device for transferring the dispensed wrapper blanks from the ready position to the mandrel comprises a swinging arm provided preferably with a suction gripper which contacts the wrapper blank along its leading edge and holds it there. It then moves the blank, releasing it from the elastic clamp until it contacts the stationary mandrel, its leading edge registering on a given line on the mandrel, and holds it in this position until the blank is safely clamped by the subsequently applied wrapping means. At this point, the swinging arm withdraws from the working area and is brought into readiness for the next cycle.

E. At the location of the cup bottom on the mandrel there is a cavity which permits the retraction of a controlled movable member, which permits the insertion of the bottom blank before the wrapper blank has been applied and, after the wrapper blank has been applied and clamped, forces it at a given impulse into its final location relative to the wrapper blank. The mandrel is further provided with ducts and vents in such manner that the completed cup can be separated and ejected by means of compressed air.

Several identical wrapping and clamping members are arranged around the mandrel in such a way that they will be moved out of the working area during the time intervals required for feeding the blanks and blowing off the completed cup. These members are being brought individually, one after the other, into their working position when the wrapper blank has been brought into registry against the mandrel. Each one is moved in such manner that the leading edge first contacts, under pressure, the wrapper blank along a generating line of the surface of revolution formed by the desired cup close to the outer edge of the element holding the blank ahead of it, and is then rotated around an axis, parallel and close to this line of contact, until its whole inner surface, which forms part of the surface of revolution, has wrapped, and now clamps, the portion of the wrapper blank it contacts against the mandrel. When all these elements are in contact the wrapper blank has been wrapped in its proper alignment around the mandrel and is clamped over the whole circumference, except for a lengthwise strip which exposes its overlapping portion of the wrapper blank. At this moment of the time cycle, bottom and wrapper blanks are both in position and three individual operations start, which are then performed simultaneously, namely:

(1) The crimping and sealing of the bottom;
(2) The sealing of the side seam; and
(3) The rolling of the rim bead.

To increase the speed of production, that is, to reduce the time required for the production of each cup, a plastic bonding agent is used on the side and bottom seams of the cup, as the use of this agent requires a much shorter time element to obtain a satisfactory bond than the use of an air-drying bonding agent. Moreover, the provision of a stationary mandrel allows a positive registry of the location of the overlap on the wrapped blank, and again a definite registry for the heat-pressure sealers to be applied on this seam.

F. A spinning head is arranged coaxially with the mandrel in such a way that it is rotated and simultaneously moved axially toward the cup. It carries a multiplicity of identical sets of rollers, each one of which again permits a controlled relative movement of the rollers making up each set. The rollers themselves are shaped and juxtaposed in such a way that at their point of contact an opening is formed representing the cross section of the desired bead or roll on the cup rim.

The shape of this opening is progressively changed by the relative movements of the rollers in each set according to the progressive change in the shape of the roll during its formation. After the completion of the roll a relative motion of the rollers at each set frees the completed bead and permits the withdrawal of the spinning head.

G. A concentric multiple die arrangement is movably supported in such a way that it can be moved out of the working area sufficiently to permit a finished cup to be blown off the mandrel in a continuous path after its completion, and to be brought into a position coaxially with the mandrel after the cup elements have been brought into location and are being held there. At this point in the cycle, an outer element of the die is moved towards the mandrel until it contacts the wrapping and holding members, thereby locking them in, and simultaneously establishing concentricity between the mandrel and the die assembly.

This same die element is provided with a circular groove in such a way that at the moment of contact it creases the wrapper blank at the circumference of the fold over. Following this, a second die member moves axially toward the mandrel forcing this overhanging portion of the wrapper blank to bend through about 180 degrees, enveloping thereby the rim portion of the bottom blank. The motion of this die element is terminated by its face contacting the bottom blank and clamping it against the movable element of the mandrel.

Finally, an annular element of elastic material, which has been brought into the space allowed by the inside of the dished bottom blank, is being compressed axially and in this way forced to expand radially against the inside of the bent over portion of the wrapper blank thereby forming and moulding a tight overlap. The die elements are then withdrawn in the reverse order of sequence.

The die assembly, furthermore, contains heating elements which raise the temperature of the inside of the forming surfaces to an appropriate temperature so that, simultaneously with the pressure moulding of the overlap, a satisfactory heat sealing bond is obtained.

H. Movable elements are provided which are brought to bear against the side seam or overlap of the wrapper blank, supplying there the temperature raise, or pressure, or temperature raise and pressure required for a satisfactory bond during the time period in the cycle during which those parts of the side seam are accessible.

I. After the cup is formed, it is blown off its seat on the mandrel by compressed air in such a way that it follows a prescribed track and thereby leaves the working area.

Advantageously, the cups are guided into a magazine which collects them until the desired number is counted off automatically. At this point this stack of cups may be deposited, as by means of a mechanical scanning device, into the next one of the empty shipping tubes arranged in a shipping carton, which in turn is placed on a conveyor arrangement.

When all the tubes in a given carton are filled, a conveyor removes it and brings an empty carton into registry with the scanning device.

All the elements described above are assembled into a self contained unit within a common frame which contains power and transmission elements; electro-mechanical and thermal controls for the various elements and for failure shut off; controls of vacuum, current and compressed air supply, etc.

It will be understood that the foregoing general description and the following detailed description as well are exemplary and explanatory of the invention but are not restrictive thereof.

In the accompanying drawings which form part of the instant specification and in which like numbers refer to like parts throughout the several views:

Fig. 6 is a view in perspective of a pre-dished bottom blank for use in the machine of Fig. 1;

Fig. 7 is a fragmentary view with parts in section of the bottom blank dispensing and feed mechanism of the device of Fig. 1;

Fig. 8 is a view in top plan of the mechanism of Fig. 7 in extended position;

Fig. 9 is a view in section taken along the line 9—9 of Fig. 8;

Fig. 10 is a view in bottom plan of the gating mechanism of the bottom blank magazine unit;

Fig. 11 is a part-sectional view taken along the line 11—11 of Fig. 10 and showing the position of the parts at the start of a cycle;

Fig. 12 is a fragmentary view of a detail of the gating mechanism of Fig. 10 showing the manner in which the rim of the bottom blank is released from the support;

Fig. 13 is a part sectional view taken along the line 13—13 of Fig. 12 with the parts in the same position;

Fig. 14 is a somewhat enlarged view in top plan of the wrapper blank dispensing and transfer mechanism shown in Fig. 4;

Fig. 16 is a view taken along the line 16—16 of Fig. 14;

Fig. 17 is a view in section taken along the line 17—17 of Fig 14;

Fig. 18 is a fragmentary view in section taken along the line 18—18 of Fig 14;

Fig. 19A is a view in plan with parts broken away, of the left hand wrapper blank wrapping and clamping unit as viewed in Fig 2, the view showing the parts in clamping position on the mandrel;

Fig. 19C is a view corresponding generally to Fig. 19B but with the parts in a later stage of the wrapping cycle;

Fig. 19D is a fragmentary view corresponding generally to Fig. 19C, but showing the arrangement of the wrapping and clamping halves at the completion of the wrapping cycle;

Fig. 20A is a view in section of the left hand wrapping and clamping unit as viewed in Fig. 2, the view being taken along the plane of the main pivot axis of the clamping unit and showing the unit with its wrapping and clamping member in clamping position relative to the fixed mandrel;

Fig. 20B is a view in front elevation of the right hand and left hand clamping units and the fixed mandrel of the device of Fig. 2, the view showing the parallel relationship of the pivot axes X—X of each wrapping and clamping unit to the line of first contact Y—Y of the wrapper blank with the mandrel;

Fig. 20C is a view in side elevation of the units shown in Fig. 20B, the view depicting the same parallel relationship as seen from the side;

Fig. 20D is a part fragmentary view in perspective of one of the wrapping and clamping members in clamping position;

Fig. 21 is a fragmentary view in side elevation of the side seam sealing means of Fig. 3, the view showing the relationship of the thermal sealing arms to the fixed mandrel in one phase of their operating cycle;

Fig. 22 is a view corresponding to the view shown in Fig. 21 but with the parts in another phase of the operating cycle;

Figure 2:
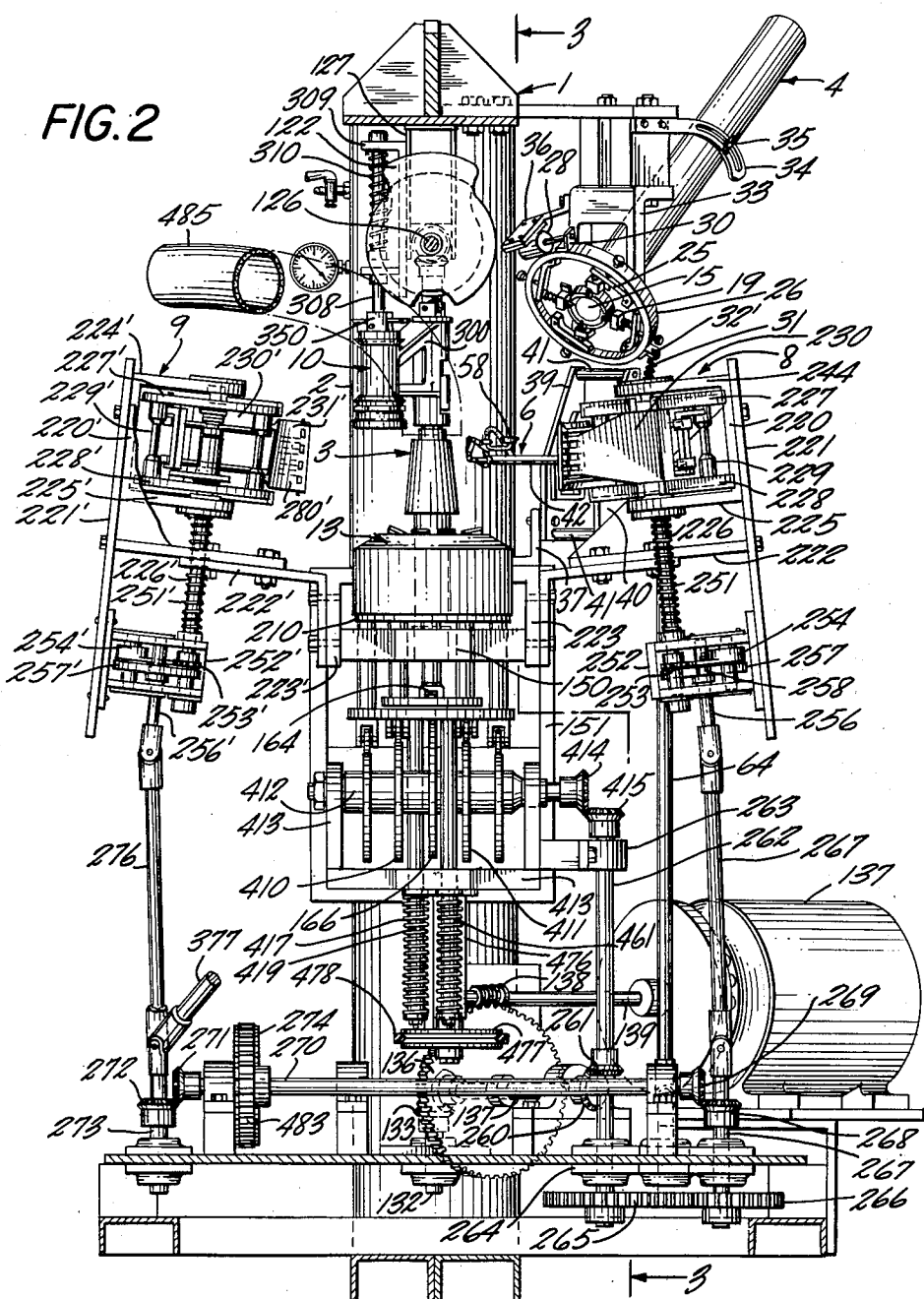
Fig. 2 is a view in section taken along the line 2—2 of Fig. 1.
Figure 24A:
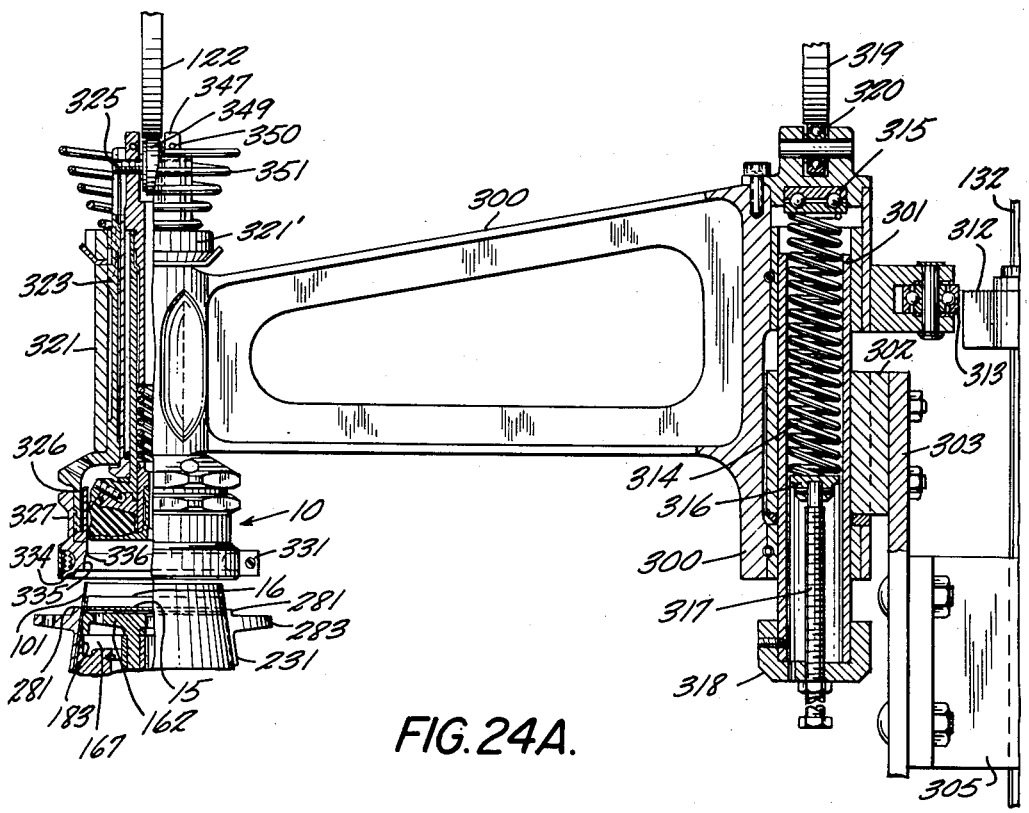
Fig. 24A is a part sectional view in side elevation of the unit shown in Fig. 23, the view showing the unit in position over the fixed mandrel at substantially the beginning of its operating cycle.
Figure 25:
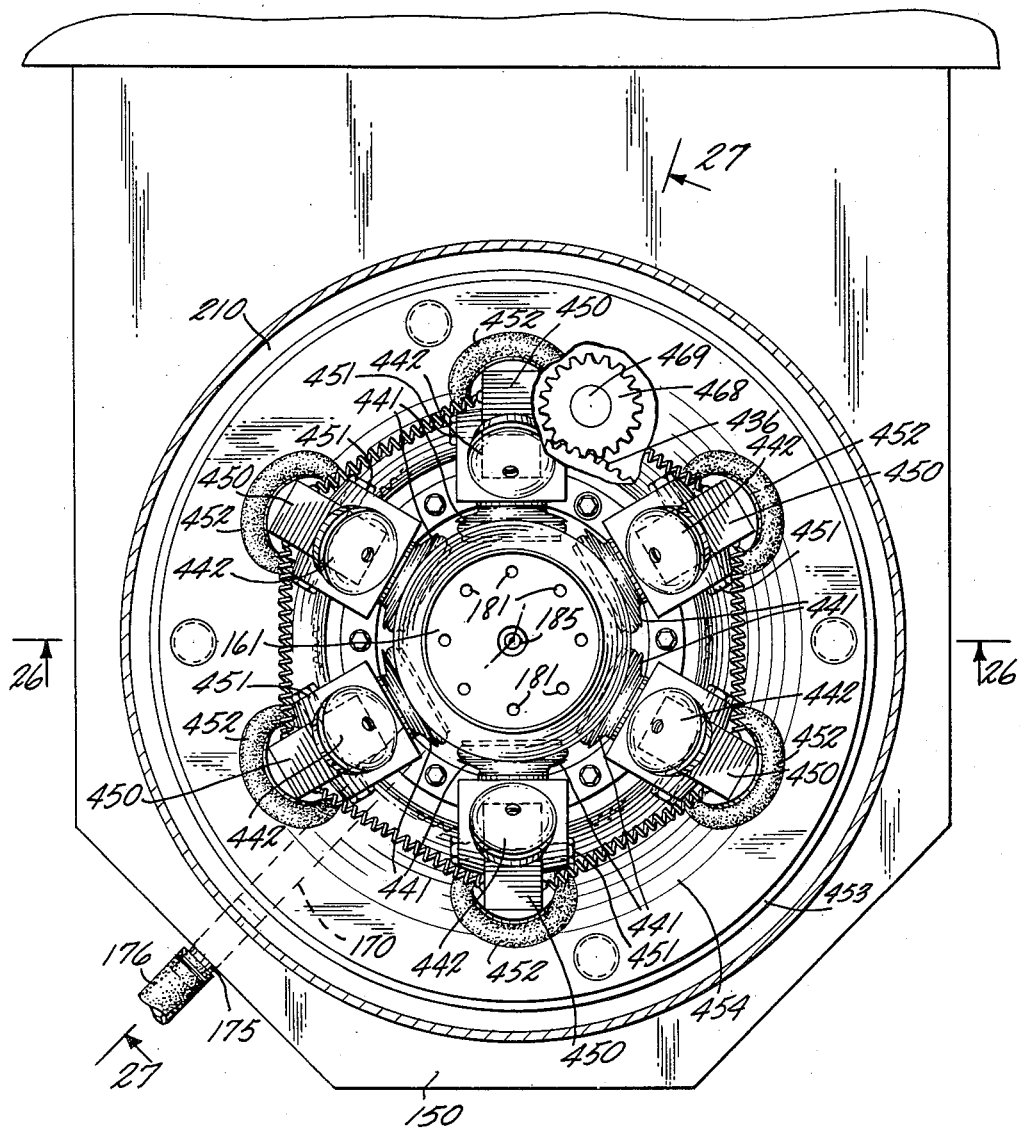
Figure 26:
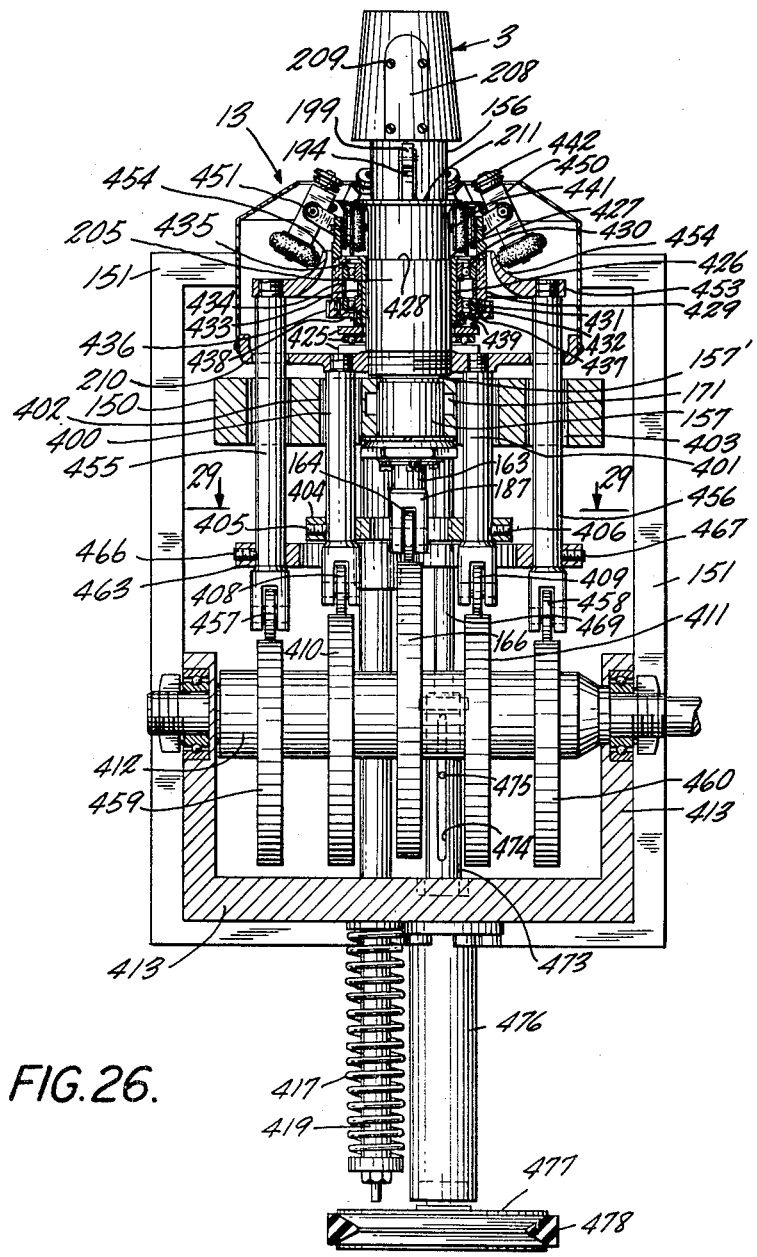
Figure 27:
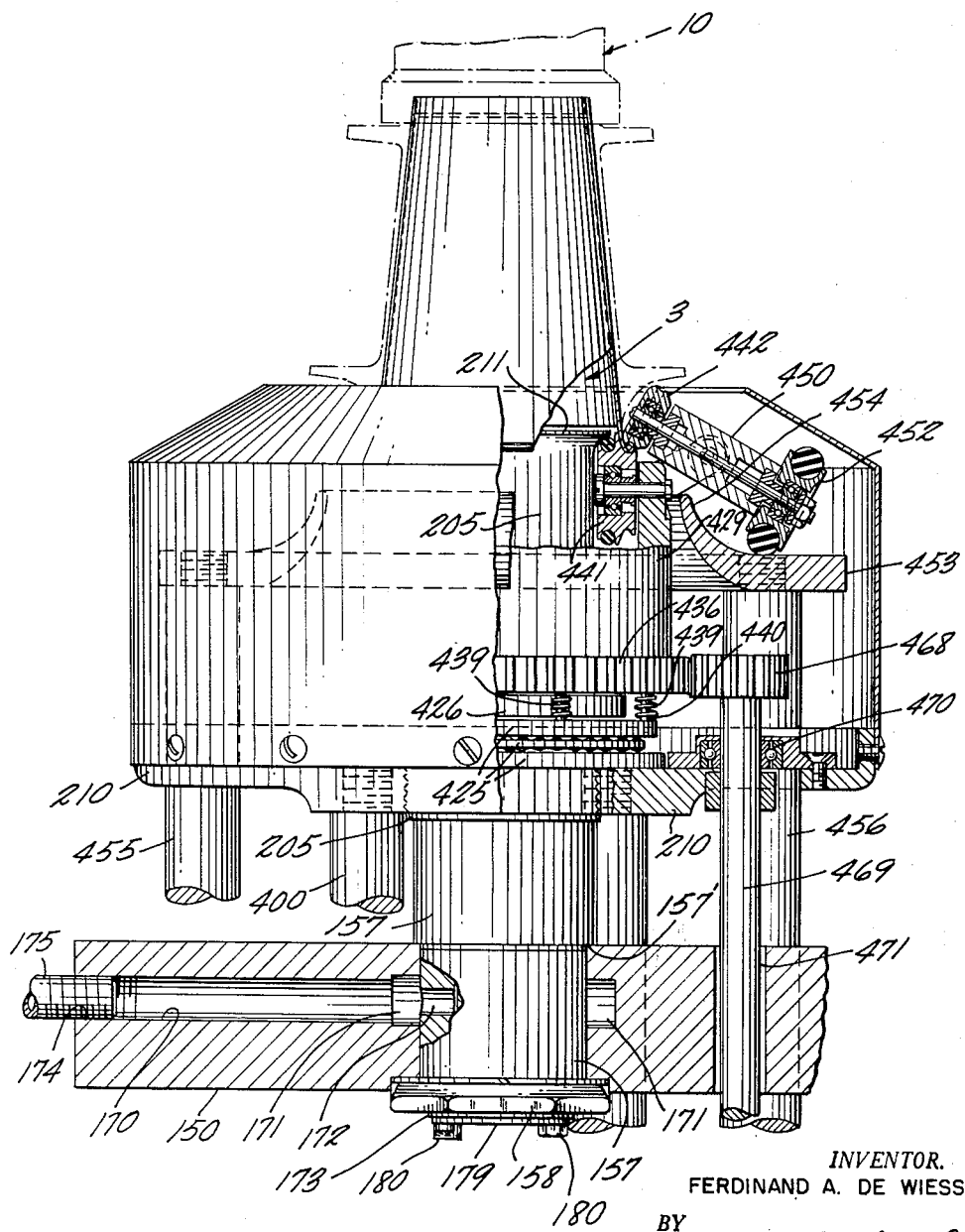
Figure 29:
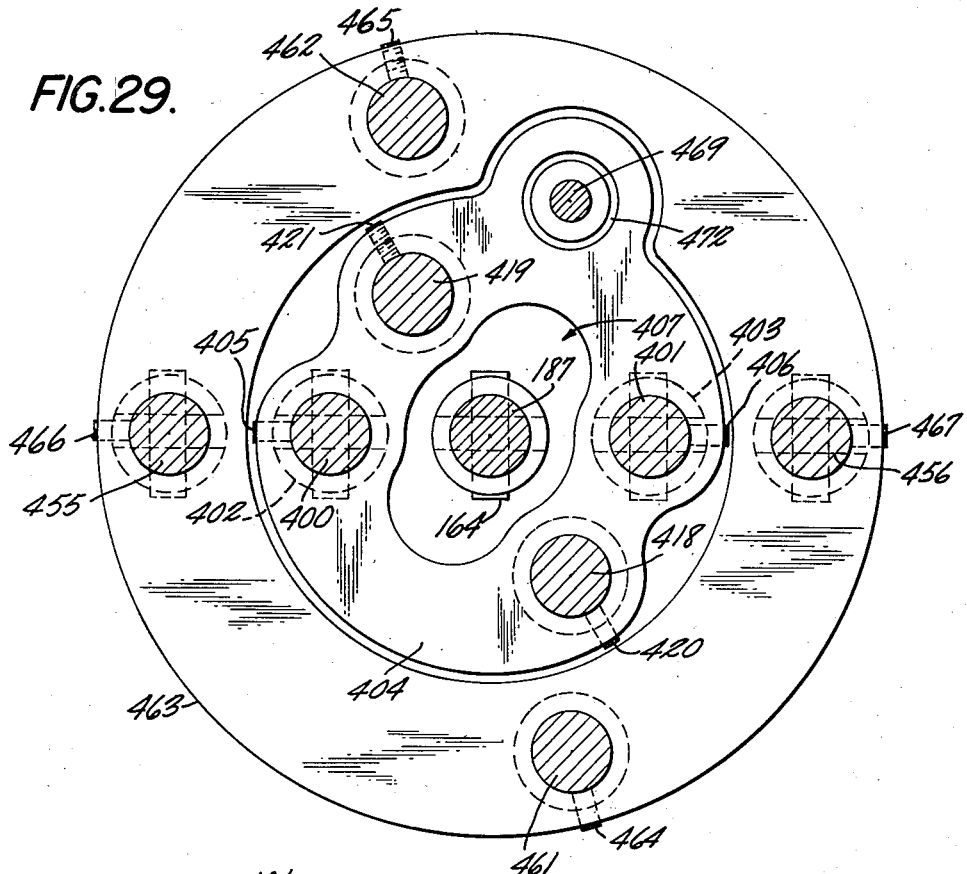
Figure 28:
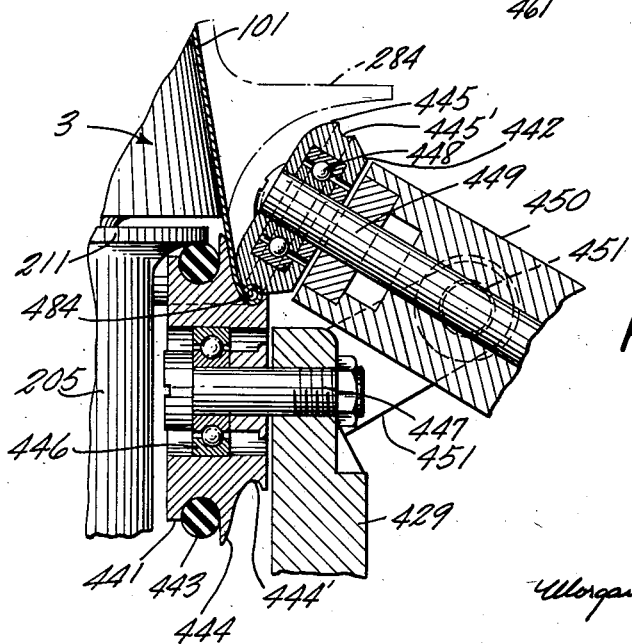

Figs. 24B, C, D and E are enlarged fragmentary views in vertical section of the bottom-sealing unit of Fig. 24A, showing the sealing head of this unit in later successive stages of its operating cycle;

Fig. 25 is a view in plan of the mandrel-spinning head assembly of Fig. 2 at the start of the spinning cycle;

Fig. 26 is a view in section taken along the line 26—26 of Fig. 25;

Fig. 27 is a fragmentary view in elevation with parts in section taken along the line 27—27 of Fig. 25, showing the mandrel-spinning head assembly in the rim rolling stage of the spinning head operating cycle;

Fig. 28 is a somewhat enlarged fragmentary view of the spinning rollers in the position shown in Fig. 27;

Fig. 29 is a view in section taken along the line 29—29 of Fig. 26;

Fig. 30 is a fragmentary view in elevation of the fixed mandrel of Fig. 26, parts being broken away in order more clearly to show the internal arrangement of parts;

Fig. 31 is a view in section taken along the line 31—31 of Fig. 30;

Fig. 32 is a fragmentary view in section of the mandrel shown in Fig. 31 with the parts disposed in side seam sealing position; and Fig. 33 is a view in section taken along the line 33—33 of Fig. 31.

Figure 1:
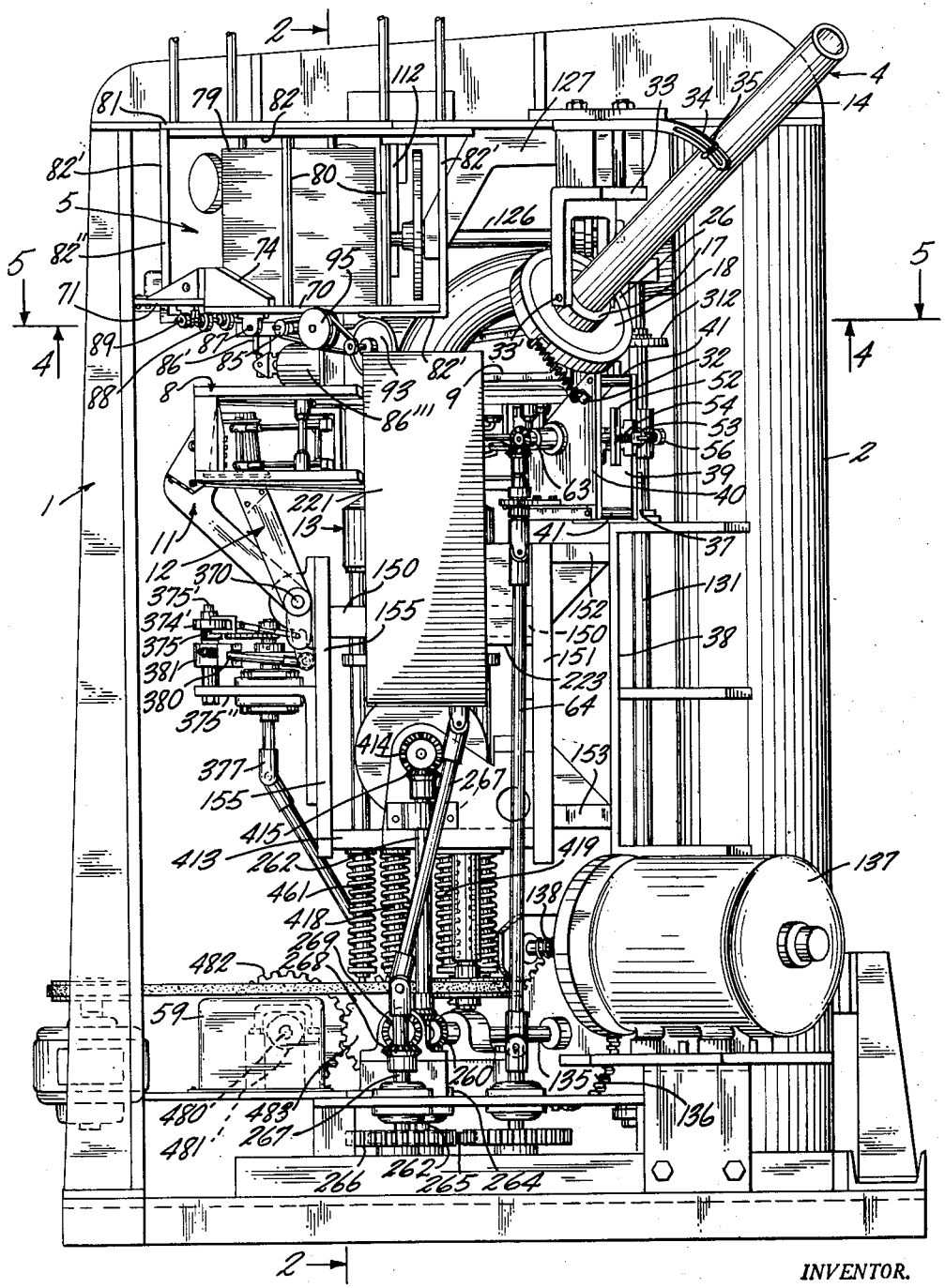
Fig. 1 is a view in side elevation of one embodiment of a cup-making machine in accordance with this invention; the view showing the parts, except for the bottom blank transfer unit, at the start of the cup-making cycle.

Referring now more particularly to the drawings, the cup-making machine as there preferably embodied comprises a main frame 1 which is of generally rectangular configuration and includes a rear vertical frame member which is hollow and serves as a vacuum tank 2 wherein air is stored under reduced pressure for use in the carrying out of various operations of the device, as will be more fully described hereinafter. The main working area of the device is characterized by a stationary mandrel 3 which is adapted to be supplied once during each cycle with a pre-formed dished bottom blank 15 (Fig. 6) from a bottom blank magazine 4 (Fig. 1), and with a wrapper blank from a wrapper blank magazine 5 (Fig. 1). The various moving parts as shown in Figs. 1 to 5, inclusive, are shown in the positions they occupy at the start (and finish) of each cycle, except for the bottom blank transfer unit 6 (Fig. 2) which, for convenience of illustration, is shown at an intermediate position. A bottom blank transfer unit 6 (Fig. 2) is provided for transferring one pre-dished bottom blank from the magazine 4 to the mandrel 3 at each cycle. Likewise, a wrapper blank transfer unit 7 is provided for transferring a wrapper blank 79 (Fig. 3) from the magazine 5 to the mandrel 3 once during each cycle.

Left-hand and right-hand wrapping and clamping units 8 and 9, respectively, (Fig. 2) are disposed at opposite sides of the mandrel 3 for progressively wrapping the wrapper blank to and clamping it about the fixed mandrel.

A bottom-crimping and -sealing unit 10 (Fig. 2) is mounted for limited vertical and swinging movement on a vertical axis paralleling the axis of revolution of the mandrel 3, into and out of crimping and sealing position in axial alignment with the mandrel 3. The bottom-crimping and -sealing unit as shown in Fig. 2 is in retracted position so as to permit the bottom blank transfer unit 6 to transfer a bottom blank from the magazine 4 to the top of the mandrel 3.

Side seam sealing elements 11 and 12 are suitably mounted for limited angular movement into and out of engagement with a wrapper blank clamped to the mandrel 3, for sealing the side seam of the cup, as will be more fully described hereinafter. A rim-rolling turret unit 13 coaxial with the stationary mandrel 3 is mounted for vertical reciprocation on the axis of revolution of the mandrel and is constructed and arranged to roll a bead rim onto the top of the cup as will be more fully described hereinafter.

Referring now more particularly to the bottom blank feed mechanism shown in Figs. 6 to 13 inclusive, the bottom blank magazine 4 comprises a cylindrical tube 14 which is open at its top and bottom and is of an internal diameter to receive snugly, but not tightly, a stack of pre-formed dished bottom blanks 15 contained therein in inverted relation, that is, with the rim 16 of the blank extending downwardly as viewed in Figs. 2 and 7. The tube 14 terminates at its bottom end in a flange 17 which is internally threaded to receive a centrally apertured gating spider 18 which, in turn, is provided at its underside as viewed in Fig. 10, with a number of gating devices 19 bolted thereto and serving to support the whole stack of bottom blanks 15 and being simultaneously operative at a given impulse, one at each cycle, to release one blank at a time so that it can be transferred by the transfer unit 6 from the bottom of the stack to the top of the mandrel 3.

The gating devices 19 are of identical construction and are disposed at equal angular distances from each other around the central opening 20 of the annular gating spider 18 so as to provide opposed pairs. Each gating device 19 is provided with a shoulder 21 which extends radially of and slightly inwardly of the rim of the central opening 20 of the gating spider to provide a discontinuous ledge around the mouth of the opening, upon which the bottom-most of the stack of bottom blanks 15 is normally supported by its rim 16. Each gating device also includes a gating latch 22 which is slidably mounted for reciprocation in the gating device radially of the opening 20 so as to be movable at a given impulse into engagement with the rim 16 of the lower-most bottom blank 15 of the stack of blanks contained in the magazine tube 14. To this end also, the top of the latch 16 as viewed in Fig. 11, is elevated above the top of the shoulder 20 only enough to engage the rim of the bottom-most blank while clearing the next higher blank.

The gating latch 22 terminates at its inner end in an inclined face 23 whose inclination as viewed in Fig. 11 substantially parallels that of the rim 16 of the bottom blank. A spring 24 coaxial with the gating latch 22 serves normally to maintain the latch in a retracted position out of contact with the rim of the lower-most bottom blank as shown in Fig. 11. Means are provided, however, for effecting inward radial movement of each gating latch into engagement with the rim 16 of the bottom blank and to force the rim radially inwardly over a small circumferential portion as shown in Fig. 12 for a distance sufficient to enable the lowermost bottom blank to pass between the oppositely disposed shoulders 21 of the paired gating devices. Each gating latch by reason of its inclined face 23 also serves to urge the bottom blank downwardly between the gating shoulders as a result of the wedging action between the inclined face and the down-turned rim of the pre-formed bottom blank. Thus, when the gating latch is returned to its normal starting position by the action of the coil spring 24, the lowermost bottom blank will be free to be withdrawn from the opening 20 by the action of the transfer unit 6, as will be more fully described hereinafter. In the embodiment of the invention as shown in Fig. 10, it will be noted that four of the gating devices 19 are employed, these being arranged in pairs so that the pressure exerted by the opposing latches 22 is equal and opposite, thus ensuring that the deformation of the rim of the bottom blank will be accomplished without other distortion of the blank as a whole.

Means are provided for simultaneously actuating all of the latches 22 once during each cycle. To this end, the gating spider 18 is provided with a number of actuating levers 25, one for each latch, pivotally mounted at one end on a pivot pin 25', on the underside of the spider, as viewed in Fig. 10. In addition, an actuating ring 26 is mounted on the actuating spider concentrically thereof for rotation relative thereto over a limited angular distance. The actuating ring carries a number of camming members 27, one for each of the actuating levers 25, threadedly received in the actuating ring in radially adjustable relation thereto. Each such camming member at its inner end contacts one of the actuating levers 25, each of the latter being positioned and arranged on its pivot axis so that angular rotation of the actuating ring will effect pivotal movement to the desired extent of the actuating lever and, in turn, inward radial movement of the allied gating latch 22. The extent of movement of the actuating levers may be governed by suitable radial adjustment of the camming members 27 in the actuating ring. The angular movement of the actuating ring is preferably effected by means of a fixedly mounted solenoid 28 whose plunger armature 29 is tangentially secured to the ring by a slotted bracket 30 so that inward movement of the armature, as viewed in Fig. 10, will effect counterclockwise angular movement of the ring thereby to drive the gating latches radially inwardly. A coil spring 31 is suitably disposed between the ring 26 and a fixed spring support 32 for the purpose of automatically returning the ring to its initial position against a stop 32' when the solenoid is deenergized.

The magazine 4 as a whole is supported from the frame 1 by a suitable bifurcated hangar 33 (Fig. 1) bolted thereto at its upper end and pivotally attached trunnion-fashion at its lower end as at 33' to the threaded collar 17 of the magazine tube 14. Arcuately slotted arms 34 of the hangar 33 are releasably connected to the tube 14 as by a wing nut and bolt unit 35 so as to permit of vertical angular adjustment of the magazine at its pivotal connection to the support 33. The solenoid 28 is also carried from the support 33 by a bracket 36 (Fig. 2).

The transfer unit 6 for transferring the bottom blanks from the magazine to the upper end of the fixed mandrel 3 is supported from the main frame 1 by means of an angle iron bracket 37 which, in turn, is mounted upon and carried by a rigid three-armed tiered bracket structure 38 secured to the vacuum tank reservoir 2 of the frame 1. The bottom blank transfer unit 6 as here preferably embodied is pivotally mounted between a pair of plates 39 and 40 disposed in spaced parallel relation to each other and rigidly connected together by struts 41, the plate 39 being bolted or otherwise suitably releasably secured to the bracket 37.

A hollow shaft or tube 42 is fixedly secured adjacent one end to a bracket 43 which in turn is pivotally mounted on the plate 39 by means of a journal bearing structure 44 so that the tube 42 is capable of pivotal movement in a vertical plane between the pick-up position shown in Fig. 7 and the deposit position shown in Fig. 9. The tube 42 is provided at its other or free end with a bracket 45 fixedly secured thereto, the bracket in turn carrying a tubular vacuum gripper unit 46 operative at a given impulse to remove the lowermost bottom blank by suction from the magazine 4 and to transfer it to the top of the fixed mandrel 3 over a compound path of movement represented generally by the dash-dot line in Fig. 7. To this end the gripper unit 46 is provided at its inner end with a rigid arm 46' pivotally connected to the bracket 45 by means of a pivot bearing 47. A link 48 is pivotally connected at one end as at 48' to the arm 46' and at the other end as at 48" to one arm of a bell crank 49 pivotally mounted by a pivot pin 49' on the bracket 45. The other arm of the bell crank is pivotally connected as at 49" to a link 50 pivotally connected as at 50' to the outer end of a hollow suction tube 51 which is telescopically slidably mounted in the pivotally mounted tube 42.

The suction tube 51 extends at its inner end beyond the inner terminus of the tube 42 and is provided with a lever arm 52 disposed at right angles thereto and engaged by an actuating pin 53 fixed and normal to the plate 39 and so disposed and arranged with relation to the pivot axis of the journal bearing 44 that pivotal movement of the tube 42 from the pick-up position in Fig. 7 to the deposit position shown in Fig. 9 will cause the lever 52 to draw the tube 51 axially to the right relative to the tube 42 as viewed in Figs. 7 to 9 inclusive, thus suitably actuating the gripper unit 46 at the same time, through the linkage system 48–50 inclusive. This movement of the lever 52 is yieldably opposed by a coil compression spring 54 surrounding the tube 51 between the lever 42 and an abutment plate 55 carried by and movable with the tube bracket 43. Thus, a return pivotal movement of the tube 42 from its position as in Fig. 9 to the position shown in Fig. 7 will result in the gripper unit 46 being returned to its initial or pick-up position by the restoring action of the spring 54 on the lever 55 and hence on the tube 51. Advantageously, the tube 51 has connected to its inner or open end a flexible vacuum supply tube 56 and is coupled adjacent its outer or closed end by a flexible tube 57 to the tubular vacuum gripper unit 46 which is a hollow tubular structure terminating at its free end in a centrally apertured, circumferentially flanged disc 58 of a configuration substantially complementary to that of the respective bottom blanks 15. The vacuum supply tube 56 is connected through suitable valving means (not shown) to the vacuum chamber 2 whose suction is applied at a suitable phase of the operating cycle through the tubes 56, 51 and 57 and the vacuum gripper unit 46 to the lowermost of the bottom blanks 15 in the magazine, thereby to enable the blank to be removed from the magazine when the gating latches 22 are withdrawn, and to transport the bottom blank thus removed through a compound curved path wherein it is inverted and deposited in an upright position in a recess in the top of the fixed mandrel 3. Coordination of the actuation of the gating mechanism and the suction applied through the tube 56 may be effected through suitable cam driven switch means controlling the valving and solenoid actuating means, provided in a central control box 59 (Fig. 1).

The pivotal movement in a vertical plane of the tube 42 on the horizontal pivotal axis provided by the bearing structure 44 is accomplished by a cross-head 60 mounted for back and forth movement in a slot 61 paralleling the axis of the tube 42 and located in the bracket 43, the cross-head being driven in obvious manner and in properly timed relation by suitable oscillating lever means 62 actuated by the crank 63' of a crank shaft 63 gear-driven in turn by a shaft 64 (Fig. 1) forming part of the main drive system to be described more fully hereinafter.

Means are provided for storing wrapper blanks and for transferring at a given impulse, once every cycle following the deposit of a bottom blank on the mandrel 3, a wrapper blank from the wrapper blank storage area to the fixed mandrel 3. As here preferably embodied, and with particular reference to Figs. 1, 4 and 14 to 18 inclusive, separate flat bed-plates 70 and 71 are horizontally disposed in upwardly stepped relation with their adjoining ends, 70' and 71', respectively, vertically narrowly spaced as shown in Fig. 18 so that the underside of the upper plate 71 parallels or substantially parallels the upper side of the lower plate 70. By this arrangement there is provided between the planes of these contiguous surfaces an opening in the form of a narrow slot 72 preferably extending the full width of the adjoining ends. A partition member 73 is disposed at the slot end of the plate 71 in abutting relation to the plate and at right angles thereto so as to extend the slot 72 longitudinally of the plate 70. Gusset members 74 and 75 are fastened to the opposite ends of the member 73 and, along the bottom of each, to the bed plates 70 and 71 so as to stiffen the bed structure as a whole. The partition member 73 serves among other things as an abutment wall, for the leading edges of the pre-cut arcuately shaped wrapper blanks 79 stacked on the bed plate 70 within the cage formed by the vertically extending guide rods 5. The partition member 73 is also vertically mortised for the reception of a gating member 76, the latter being vertically adjustable relative to the partition member 73 so as to permit of its bottom end being raised, or lowered, relative to the bed plate 70 thus enabling the vertical height of the entrance to the slot 72 to be increased or decreased at will within the limits fixed by the vertical end spacing of the bed plate 70 and the bed plate 71. Vertical adjustability of this gating member 76 is made possible through the provision of bolt means 77 carried by the member 76 and traversing suitably dimensioned and located openings 78 in the support member 73. The slot 72 is of an effective height determined by the vertical positioning of the gating member 76 and, as a maximum, is slightly more than one—but considerably less than two-wrapper blank thicknesses. Thus, not more than one wrapper blank at a time can be slid from the bottom of the stack into the slot 72.

The bed plate 70 serves to support a stack of the wrapper blanks 79 located within the confines of a cage formed by a plurality of vertically extending rods 80. The rods 80 may be threadedly received at their lower ends in the bed plate 70 and extend upwardly through the rectangular opening of a rectangular frame 81 which, in turn, is fixedly supported by and on a cantilever bracket 82 fixedly secured to the top of the main frame 1. It will be understood however, that the cage formed by the rods 80 functions to support the vertical stack of wrapper blanks 79 on the bed plate 70 but that any other suitable form of cage or magazine could be provided and could have cutting devices at its upper end operative to slit a carton containing the wrapper blanks when inserted into the magazine for loading purposes. Hangars 82' and 82" secured at their upper ends to the cantilever bracket 82 are bolted at their lower ends to the bed plates 70 and 71 to support the latter at the required level therefor.

Each of the wrapper blanks 79 as shown constitutes a developed surface of a surface of revolution corresponding to that of the mandrel 3 which, as shown, is a frusto-conical surface.

With a stack of wrapper blanks stationed on the bed plate 70 in the position shown by the dash-dot line in Fig. 14, the left hand edge of the blank, as viewed in Fig. 14, will constitute the leading edge of the blank. Means are provided for frictionally sliding the lowermost wrapper blank forwardly through the slot 72 into a position under the bed plate 71 where it is gripped at its leading edge by a second friction device which keeps it moving forwardly in sliding engagement with the bed plate 71, contacting the latter on the surface opposite to the one on which it was resting before, until it is brought to a stop by registry with its leading edge against a bar 100. To this end, the bed plate 70 is provided with a series of drive-roller openings 83 disposed in a row extending transversely of the bed plate and running each from top to bottom of the bed plate. Rollers 84 each having a circumferential surface of soft rubber or other suitable friction material are mounted for movement upwardly in the respective openings 83 so as to engage the lowermost wrapper blank of the stack supported by the bed plate 70, with a force sufficient upon rotation of the rollers to slide the blank out from under the stack and forwardly through the gate 72 as previously described. The rollers 83 are carried on a common shaft 85 journaled for rotation in the ends of the legs of a U-shaped hangar 86 which is trunnioned at its base to the underside of the bed plate 70 and on an axis paralleling the axis of the roller shaft 85, by means of trunnion bearings 87 located on the underside of the bed plate 70. The base of the U-shaped roller hangar 86 is provided with a downwardly extending tongue 86' pivotally connected at its lower end to the spring pressed armature 86" of a solenoid 86''' supported fixedly from and at the underside of the bed plate 70. Thus, the roller shaft 85 which is continuously driven may be angularly adjusted upwardly about the parallel pivot axis through the bearings 87 by inward movement of the armature 86" resulting from the energizing of the solenoid 86''' for the requisite time once during each cycle. The extent of movement is such as to exert through the rollers 84 a predetermined pressure against the lowermost wrapper blank in the stack. The rollers 84 are of progressively decreasing diameter in the direction of decreasing length of the wrapper blank so that the forward movement of the blank advancing through the guide slot 72 will be in an arcuate path. This path terminates at the stop 100 and at that terminus the leading edge of the wrapper blank will be in a plane L—L of the vertical axis of the fixed mandrel 3 denoted by the dash-triple dot line in Fig. 14.

A second set of continuously driven friction drive rollers 88 is carried by a roller shaft 89 fixedly supported at its opposite ends in journal bearings 90 beneath the bed plate 71. The rollers 88 are of progressively decreasing diameter across the bed plate as viewed in Fig. 14, just as in the case of the rollers 84 and for the same purpose. The bed plate 71 above each roller 88 is provided with a shallow recess 91 of a configuration complementary to the circumferential surface of the underlying roller. Thus, when the lowermost wrapper blank is advanced through the gating slot 72 by the rollers 84, its leading edge ultimately enters the recesses 91 between the bed plate 71 and the rollers 88 wherein it is frictionally engaged by the rollers 88 and the forward transport of the wrapper blank thereby taken over and continued by these rollers. The recesses 91 serve to enable the obtainment of a greater contact area, and hence "pull," between the rollers 88 and the wrapper blank without deformation of the roller circumference, than would be possible if substantially tangential contact were relied on. Guide lugs 92 extend downwardly from the bed plate 70 and are so disposed as to confine the forward movement of the advancing wrapper blank to the prescribed arcuate path above mentioned.

The sets of rollers 84 and 88 are preferably continuously and simultaneously driven by an electric motor 93 carried by and below the bed plate 70 and operatively connected to the roller shafts 85 and 89 by suitably arranged and dimensioned pulleys 94 and pulley connecting belts 95. It will be understood that the rollers will be operated continuously but that the transport of the lowermost blank through the gating slot 72 once at each cycle will be effected by the application from the main valving and timing unit 59 (Fig. 1) of an impulse to the solenoid 86''' once during each cycle and in suitably timed relation to the feeding of the bottom blank and the other units of the cup-making machine described more fully hereinafter.

Figure 15:
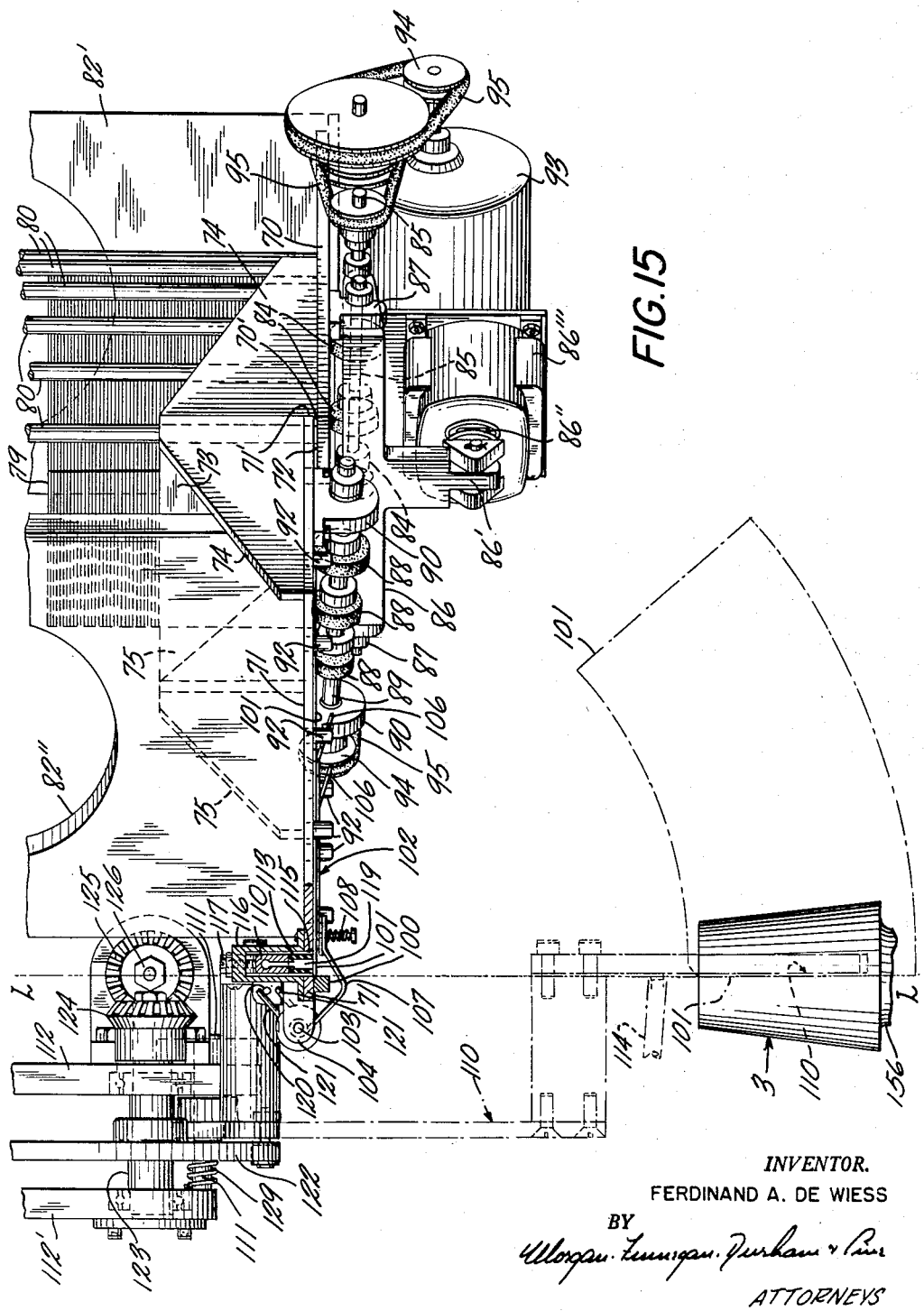
Fig. 15 is a view in side elevation of the wrapper blank magazine and dispensing and transfer mechanism of Fig. 14.

Advancing of the wrapper blank by the second set of friction drive rollers 88 continues until the leading edge of the blank linearly abuts the stop bar 100 by which the forward movement of the wrapper blank is terminated. In Fig. 15 a wrapper blank which is now designated by the numeral 101 is depicted in this position and it will be noted from Fig. 14 that when the leading edge of the wrapper blank abuts the bar 100, the trailing edge of the blank has just been discharged by the drive rollers 88. In this position, the wrapper blank is held in firm contact with the underside of the bed plate 71 by means of an elastic clamp 102 (Fig. 16) which is carried on and by a shaft 103 journalled for pivotal movement in a bracket 104 fixedly supported on and by the bed plate 71. The clamp 102 is preferably elastic or flexible in nature over that part of it which engages the wrapper blank to hold it against the bed plate 71. Advantageously, the clamp comprises a U-shaped clamping portion 105 (Fig. 16) paralleling the bed plate 71, each leg of the U terminating adjacent its free end in a guide portion 106 inclined downwardly of the bed plate 71 so as to provide a tapered opening to facilitate the entrance of the forwardly moving wrapper blank between the clamp and the bed plate. Advantageously also, the U-shaped clamping portion 105 may be made of thin brass stock or other relatively flexible material and is yieldably secured to a relatively rigid cantilever arm portion 107 of the clamp by means of spring-pressed studs 108, the studs 108 serving to permit a minor amount of flexing of the parts 105 and 107 of the clamp relative to each other thereby ensuring that the wrapper blank 101 may smoothly travel between the clamp and bed plate until its leading edge abuts the bar 100. A coil spring 109 on the axis of the shaft 103 acts to hold the clamping member 102 yieldably against the undersurface of the bed plate 71 and thus to hold the wrapper blank 101 in position to be transferred as the next step by a swinging arm 110 from its ready position under the bed plate 71 to the fixed mandrel 3.

The swinging transfer arm 110 is carried at one end on a shaft 111 suitably journaled in a vertically disposed hangar bracket 112 fixed to the frame 1 of the machine, the pivotal axis of the shaft 111 being horizontal so that the arm 110 may swing in a vertical plane between the dash-dot line position shown in Fig. 16 and the solid line position of the same figure. The arm 110 at its free end is provided with a vacuum gripper 113 (Fig. 16) to which suction is applied through a flexible suction line or tube 114 at the proper phase of each cycle of operation, for gripping the wrapper blank 101 along its leading edge, transferring the wrapper blank from the underside of the bed plate 70 to the mandrel 3 with its leading edge registering on a given line L—L (Fig. 15) on the mandrel, and holding it in this position until the blank is safely clamped by the subsequently applied wrapping and clamping units 8 and 9. At this point in the cycle the swinging arm 110 withdraws from the working area and is brought into readiness for the next cycle. As will be noted from Fig. 15, the bed plate 71 is provided with a slot 115 paralleling the stop bar 100 and immediately adjacent thereto. The suction gripper 113 in its starting position as shown in Fig. 15 will be disposed in the slot 115 with its suction surface substantially co-planar with the undersurface of bed plate 71 and thus in engagement with the top surface of the wrapper blank 101 along the leading edge of the latter. A housing 116 positioned over this slot and carried by the bed plate 70 is provided with a set screw 117 whose bottom end engages the top of the arm 110 so as to permit the vertical height of the vacuum gripper unit 113 in its starting position to be adjusted accurately so that the bottom suction face 118 of the latter with its multiple suction openings 119 will be co-planar or substantially co-planar with the underface of the bed plate 71 in the slot 115. Preferably, the gripper unit 113 is made of rubber or other suitable resilient material which will serve to cushion the impact of the gripper unit when it meets the stationary mandrel 3.

A clamping-actuating lever arm 120 carried by the arm 110 extends between a pair of lugs 121 carried by the shaft 103 at one end thereof and, on downward movement of the arm 110, rotates the shaft 103 so as to move the clamping member 102 downwardly, as viewed in Fig. 15, thereby to uncover the slot 115 and permit of the gripper unit 113 transferring the wrapper blank 101 from the bed plate to the mandrel 3. Similarly, on the return movement of the arm 110, the actuating finger 120 restores the clamping unit 102 to its initial starting position.

Movement of the transfer arm 110 toward the mandrel 3 is effected by a cam 122 which is mounted on a shaft 123 journalled for rotation in the parallel hanger brackets 112 and 112', the shaft 123 being gear-coupled by gears 124 and 125 (Fig. 14) to one end of a shaft 126 journaled for rotation in a bracket 127 carried by the frame 1. The axis of the shaft 126 is disposed in the plane L—L (Figs. 14 and 15) containing the vertical axis of the fixed mandrel 3.

A cam follower 128 carried by the swinging arm 110 engages the suitably contoured circumferential surface of the cam 122 so that the swinging arm will effect the transfer of the wrapper blank 102 from the bed plate 71 to the fixed mandrel 3 in properly timed relation to the other elements of the machine, once during each cycle. The return of the swinging arm from the wrapper blank applying position shown in solid lines in Fig. 16 to its starting position shown by the dash-dot lines in Fig. 16 is preferably effected by means of a coil spring 129 on the shaft 111, the spring 129 being connected at one end to the arm 110 and at the other end to the support plate 112'.

The shaft 126 is gear coupled at its other end by gears 130 and 131 to the upper end of a vertical cam shaft 132 which in turn is coupled at its lower end by gears 133 and 134 (Fig. 3) to a pinion shaft 135 carrying a pinion gear 136 driven continuously by an electric motor 137 coupled thereto by a worm gear 138 on the motor shaft 139.

The mandrel 3 is carried by a strong, rigid and stationary mandrel support member 150 (Fig. 5) which, in turn, is rigidly attached to and supported by and from a vertically disposed rectangular rear frame 151 secured fixedly adjacent its top and bottom by horizontal brackets 152 and 153, respectively, to the main bracket structure 38 connected, in turn, to the vacuum tank 2 as previously described. The frame 151 also serves to support rigidly at its bottom a spring bed-plate 154 paralleling the mandrel support 150 and serving together with the latter to support fixedly, a vertically extending front mounting plate 155 paralleling the rear frame structure 151. The sealing arms 11 and 12 for sealing the side seam of a cup formed on the mandrel are carried by the plate 155 upon which they are mounted for angular movement upon a common axis into and out of sealing contact with a wrapper blank on the mandrel during one phase of the operating cycle, as will be described more fully hereinafter.

The mandrel 3 as shown in Figs. 30–32 is secured fixedly to the top of a strong and rigid tubular post 156 by a male and female connection 156'. The post at its lower end is still further reduced in diameter to provide a mounting portion 157 having at its upper end an annular clamping shoulder 157'.

The mandrel support 150 is suitably centrally apertured for the insertion of the mounting portion 157 therein so that the shoulder 157' will be seated on the support. In this position, the mounting portion 157 extends below the support and is threadedly engaged by a nut 158 releasably securing the post to the support.

The mandrel 3, as viewed in Fig. 30, has a moulding surface 160 which is a surface of revolution, preferably a frusto-conical surface to which the wrapper blank 101 is to be applied and wrapped. The top of mandrel is constituted by the circular top surface 161 of a piston 162 upon which the bottom blank is registered prior to the application of the wrapper blank to the surface 160. Piston 162 is carried at the upper end of a tubular piston rod 163 whose lower end carries a roller 164 journaled on a roller shaft 165 and serving as a cam follower engageable by a cam 166 for effecting vertical movement of the piston 162 upwardly from its retracted position seated in a cavity 167 in the top of the mandrel as shown in Fig. 32 to the extended position of the piston, shown in Figs. 30 and 31. When applying the bottom blank to the mandrel, the piston is retracted as in Fig. 32 so that the blank, in its preliminary position of registry, is seated in the cavity 167. After the wrapper blank has been applied and wrapped around the mandrel, the piston is moved upwardly, thus moving the bottom blank upwardly into its final position of registry with the conically shaped wrapper blank.

The tubular piston rod 163 is slidably mounted for reciprocation in the bore 168 of the mandrel 3 and post 156 and is of an outside diameter slightly less than the diameter of the bore so as to provide an annular space therebetween through which suction is adapted to be applied to the cavity 167 via a conduit 169 in the mandrel, communicating at its upper end with the cavity and at its lower end with the bore 168. Suction is applied to the bore at its lower end via a suction conduit 170 in the mandrel support, the conduit 170 terminating at its inner end in an annular header 171 from which one or more radially extending connecting passageways 172 lead through the mounting shank 157 of the post into the bore 168. The conduit 170 is internally threaded at its outer end as at 174 (Fig. 27) for the reception of a nipple 175 (Fig. 25) to which a flexible suction tube 176 is attached for connection through suitable valving (not shown) to the vacuum chamber 2 formed by the frame 1.

The tubular piston rod 163 is of an outside diameter adjacent the piston 162 to fit snugly and sealingly within the bore 168 and prevent the entrance of air into the bore from the cavity 167. Likewise, the bore 168 is hermetically sealed at its lower end beneath the annular header 171 by an annular sleeve 177 slidably supporting the piston rod and sealed at its lower end by a packing ring 178 compressed between the sleeve 177 and a packing ring collar 179, by an annular row of collar retaining bolts 180. A circular row of openings 181 lead through the piston 162 from the piston surface 161 to the cavity 167 so that suction in the cavity will be applied to a bottom blank in registry on the surface 161 and thereby hold the bottom blank firmly in registry while a wrapper blank is being applied to the surface 160 and wrapped about the mandrel. An annular cylindrical skirt 182 on the piston snugly engages the cylindrical wall 183 of the cavity 167 thus minimizing leakage of air between the piston and the mandrel and ensuring maintenance of the proper suction on a bottom blank in registry on the surface 161.

A tube 184 disposed within and concentrically of the piston tube 163 connects a central opening 185 in the piston with an air feed duct 186 formed in a closure 187 which seals the bottom of the piston tube 163 and carries the cam follower roller 164. Gaskets 188 and 189 at the bottom and top, respectively, of the tube 184 ensure against air leakage at these places. A set screw 190 locks the tube 184 to the closure 187 and a bushing 191 concentric with the set screw 190 locks the closure 187 to the tubular piston rod 163 to prevent relative rotation of these elements. A nipple 192 carried by the closure 187 leads from the conduit 186 therein and is adapted to be connected by a flexible tube (not shown) to a pressure tank (not shown) from which air under pressure may be supplied through a suitable valving mechanism (not shown) to the piston opening 185 via the tubes 192 and 184 at the completion of the operating cycle, for blowing the completed cup off the mandrel.

The moulding surface 160 of the mandrel is of a length measured along one of its surface elements such that with the wrapper blank wrapped about the mandrel, a portion of the wrapper blank will extend beyond the bottom edge of the surface 160.

The surface 160 provides a backing or anvil surface against which sealing pressure may be applied to the seam of the wrapper blank portion which is on the mandrel, by means of the sealing arm 11, as shown in Fig. 22, but in order to enable the sealing of the overlap of the extended portion, retracted anvil means are provided for backing up this extended portion of the wrapper blank at the overlap so that sealing pressure can be applied to the seam at the overlap by means of the sealing arm 12, as shown in Fig. 22. To this end anvil member 194 is pivotally mounted on a horizontal shaft 195 located within a recess 196 extending longitudinally of the mandrel post 156. A spring 197 is secured within the recess 196 by means of pins 198 and engages the anvil member so as to urge it outwardly from a position wherein it is wholly retracted within the recess 196, as shown in Fig. 31, to an extended position, as shown in Fig. 32, wherein it presents an anvil face 199 in alignment with and constituting an extension of the moulding surface 160 of the mandrel proper. In this latter position the anvil member is locked securely against inward movement toward the retracted position by means of a camming roller 200 which is seated in an arcuate complementary recess 201 at the back of the anvil member and bears against the male member 156″ of the male-female connection 156′ of the mandrel and post. The roller 200 is carried by and at the upper end of a yoke member 202 which terminates at its lower end in a plate 203 fixedly secured by means of screws 204 to a cylindrical spinning-roller drive-sleeve 205 concentric with the mandrel post 156 and snugly slidably mounted on the post for axial movement toward and away from the mandrel 3. A leaf spring 206 carried by the anvil member is disposed to be engaged by the plate 203 in the extended position of the anvil member and thus to cushion the anvil member as the roller 200 seats itself in the recess 201 of the anvil member. In the retracted position of the anvil member, as shown in Figs. 30 and 31, the anvil actuating roller 200 and its supporting yoke 202 extend upwardly into the mandrel 3 to which end the latter is provided with a roller recess 207 which, generally speaking, forms a continuation of the post recess 196. This recess is normally closed by suitably curved access plate 208 which is removably secured to the mandrel by screws 209 and forms part of the surface 160. The combined spinning-roller-drive and anvil-actuating sleeve 205 at its bottom end threadedly engages annular spinning-roller carriage plate 210 by which the sleeve 205 is adapted to be moved axially upwardly in relation to the post 156 from the fully retracted position shown in Figs. 26 and 32 wherein wrapping, clamping, and side seam sealing are carried out, to the fully elevated (or extended) position shown in Figs. 27, 30 and 31, wherein the rim-spinning and bottom-crimping and sealing operations are carried out in the partially completed cup on the stationary mandrel. The upper end of the sleeve 205 is therefore provided with a flange 211 extending circumferentially thereof and adapted to serve as a track upon which a set of rim-spinning rollers 441 constantly bears, both in the retracted position shown in Fig. 26 and the elevated position shown in Figs. 27 and 28, and will travel, as will be described more fully hereinafter.

The wrapping and clamping units 8 and 9 function to wrap the wrapper blank progressively around the mandrel working outwardly from the "line of first contact" of the wrapper blank on the mandrel to the "free" end of the blank. They are disposed at opposite sides of the mandrel 3 and are arranged around the mandrel in a way such that, as is apparent from Fig. 2, they will be out of the working area during the time intervals required for feeding the bottom blank and the wrapper blank to the mandrel, and blowing off the completed cup. The units 8 and 9, as shown, are of identical construction, except as may be hereinafter noted with respect to the unit 9, and a description of one will therefore suffice for both. The following description will therefore be directed to the unit 8 since it is the first to be moved into contact with the wrapper blank. The Figs. 19A, 20A and 20D depict in detail the construction and arrangement of this unit. For convenience, the reference characters for corresponding elements of the unit 9 will be primed.

The unit 8 as depicted in these figures comprises a U-shaped bearing bracket 220 bolted at its base or otherwise fixedly secured to a rigid mounting plate 221 which, in turn, is rigidly supported by and carried from the rectangular frame 151 (Fig. 2) through the medium of a bracket structure 222 connecting the plate 221 to a cantilever arm 223 secured to the main mandrel support member 150 and frame 151. The upper and lower legs 224 and 225, respectively, of the U-shaped bearing bracket 220 serve as upper and lower bearing arms, respectively, for a shaft 226 journalled for rotation therein, upon which a carriage comprised of upper and lower rigid and generally triangular frame structures 227 and 228, espectively, is journalled for swinging movement toward and away from the mandrel 3.

The frame structures 227 and 228 are spaced apart and rigidly connected together at their inner ends by struts 229 and at their outer ends by a cantilever arm 230 upon which a wrapping and clamping member 231 is pivotally mounted on a pivot pin 232, the pivotal axis X—X of which parallels the pivotal axis Z—Z of the shaft 226 as shown in Figs. 20B and 20C, both axes paralleling a generating line Y—Y of the surface of the mandrel representing the desired "line of first contact" of the wrapping and clamping member 231 with a wrapper blank on the mandrel. (The corresponding set of axes and first contact line for the unit 9 is designated by the legends X′—X′, Z′—Z′, and Y′—Y′.) Thus, the wrapping and clamping member 231 is adapted to be moved bodily as a unit in an arc of constant radius about the axis of the shaft 226 and without changing the parallelism of the axes X—X and Z—Z to the line Y—Y, into first contact with the mandrel along the generating line Y—Y.

Means are provided also for pivotally moving the wrapping and clamping member 231 on the axis of the shaft 232 after it has been bodily moved into its first line-contact position. To this end, a U-shaped lever having the upper and lower legs 233 and 234, respectively, is mounted between the upper and lower frame structures 227 and 228 for swinging movement on an axis paralleling the line of first contact Y—Y, pivotal connection of the upper and lower legs 233 and 234 to the upper and lower frame structures 227 and 228 being effected by suitable upper and lower axially aligned pivot couplings 235 (Fig. 20A). The clamping member 231 is connected to the upper and lower lever arms 233 and 234 by upper and lower adjustable length links 236 and 237 respectively which are pivotally connected at their outer ends to the top and bottom, respectively, of a shaft 238 carried by the clamping member, and at their inner ends to the lever arms 233 and 234, respectively, by means of upper and lower pivot pins 239 whose pivot axes parallel each other and the axis of the shaft 238. The mode of connecting the upper link 236 to the lever arm 233 is depicted in Fig. 20A, a similar pin connection to the lower lever arm 234 being provided at the inner end of the lower link 237. Thus, the clamping member 231, the U-shaped lever with its arms 223 and 224, and the links 236 and 237 provide parallel motion means between the pivot axis of the pin 232 and the pivot axis of the pivot couplings 235.

Figure 19B:
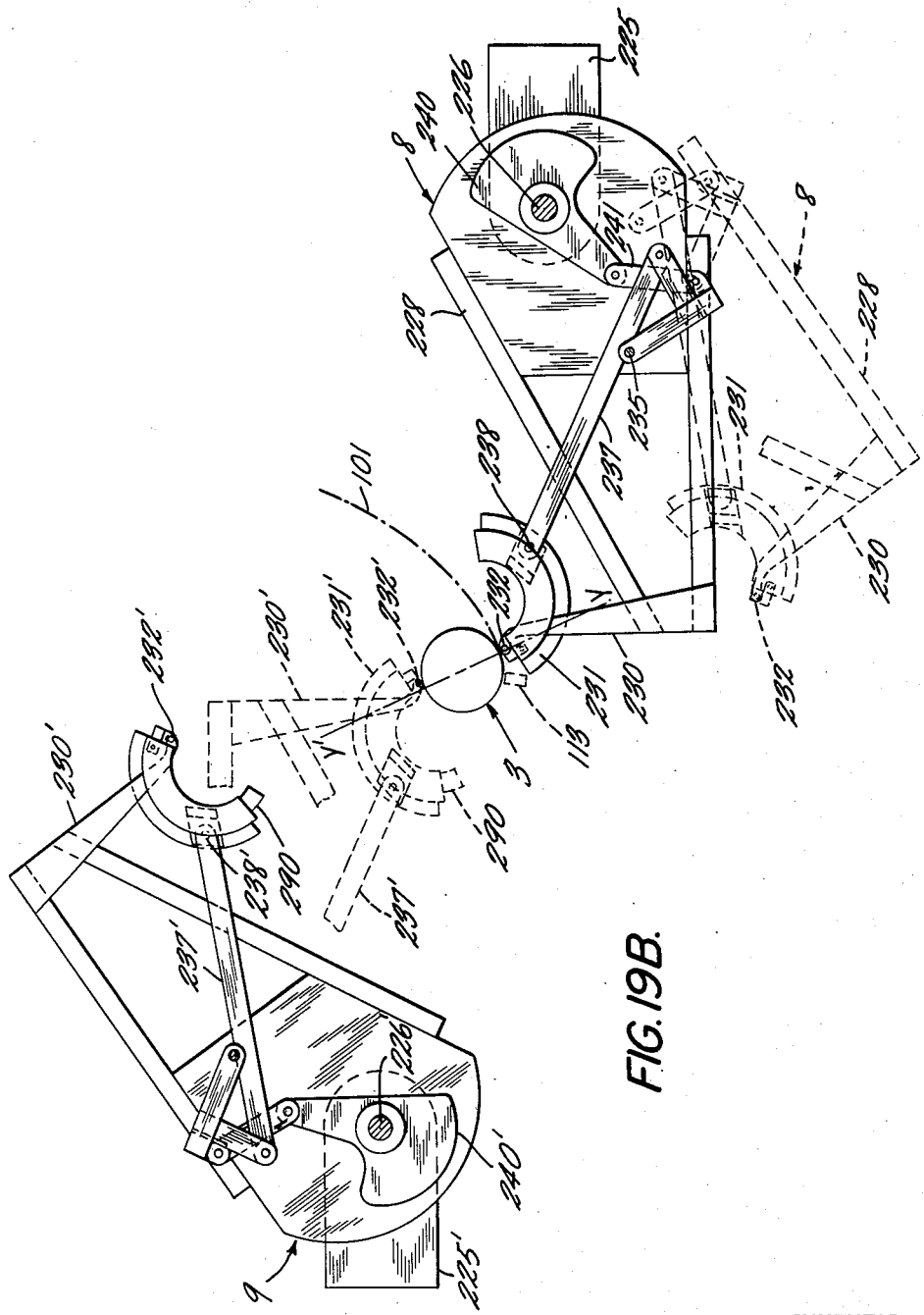
Fig. 19B is a semi-diagrammatic view in top plan of the left hand and right hand wrapping and clamping units as viewed in Fig 2, showing the relationship of the wrapping and clamping members to the fixed mandrel at an early stage of the wrapping of the wrapper blank on the mandrel.

Angular movement of the wrapping and clamping member 231 on its pin 232 relative to the arm 230 and mandrel 3 after "first contact" is effected by means of a crank 240 keyed to the shaft 226 and pivotally connected by a link 241 to the lower lever arm 234 of the parallel motion means. Thus, relative angular movement of the clamping carriage and the crank 240 on the axis of the shaft 226 is possible, the arrangement of the parts being such that in operation the clamping member 231 is first moved bodily from its retracted position as in Fig. 20B over an arcuate path into contact with the mandrel along a generating line Y—Y (line of first contact) of the mandrel surface and then rotated about the axis of the shaft 232 into complete engagement with the mandrel. This compound movement is illustrated diagrammatically in Figs. 19B to 19D inclusive wherein it will be observed that the clamping unit 8 moves from its dotted line position shown in Fig. 19B to the solid line position there shown wherein the leading edge of the wrapping and clamping member 231 first contacts, under pressure, the wrapper blank 101 along a generating line in the plane Y—Y′ of the cone formed by the desired cup, close to the outer edge of the gripper unit 113 temporarily holding the wrapper blank 101 ahead of it. The member 231 is then rotated by the action of lever 240 around the axis of the shaft 232 which is parallel and close to this line of contact, until its whole inner surface, which forms part of the cone, has wrapped, and now clamps, the portion of the wrapper blank it contacts against the mandrel as shown in the solid line position of the clamping unit 9 in Fig. 19C. When the clamping member 231 has arrived in this position the clamping unit 9 follows a corresponding sequential operation in successive phases from the retracted position shown in solid lines in Fig. 19B to a position wherein the leading edge of the clamping member 231' engages the partially wrapped wrapper blank corresponding to the dotted line position of the clamping unit 9 shown in Fig. 19b, the operation continuing through the solid line position of the wrapping and clamping member 231' as shown in Fig. 19C until the whole wrapper blank is completely wrapped on the mandrel with its leading and trailing edges overlapping slightly in the final position of the clamping members as indicated in Fig. 19D. Heat and/or pressure sealing of the wrapper blank along the overlap, and rolling and crimping of the top and bottom edges of the wrapper blank then follows, as will be more fully described hereinafter.

In the position of the clamping member 231 shown in Fig. 19A, the carriage formed by the upper and lower carriage members 227 and 228 has been rotated clockwise by the shaft 226 and is temporarily held against counterclockwise movement which would return the carriage to its initially retracted posiiton, by the force exerted on the carriage by the crank 240 acting through the connecting lever system 241 and 243, on the upper and lower pivot pins 235 (Fig. 20A). However, clutch means are provided between the carriage of the wrapping and clamping unit 8 and the crank 240, operative to connect the carriage securely to the crank in its retracted or starting position shown in dotted lines in Fig. 19B and during the phase of movement of the clamping unit 8 from its retracted or starting position to the solid line position shown in Fig. 19B wherein the leading edge of the clamping member 231 first contacts the wrapper blank 101 in position on the mandrel 3. From this position on the carriage it is decoupled from the crank 240 and thus from the drive shaft 226 upon which latter it is then journalled for relative rotation. To this end and as shown in Figs. 19A and 20A, the crank 240 carries on its undersurface one of a pair of superposed, apertured arcuate clutch members 242 and 243, clutch member 243 being carried on the top surface by the bottom leg 225 of the U-shaped bracket 220, subjacent the clutch member 242. Both clutch members are concentric with the shaft 226 and are provided at one pair of corresponding ends with an opening 244 in the case of the clutch member 242 and an equal diameter opening 245 in the case of the clutch member 243. The crank 240 extends between these overlying clutch members and is provided with an annular fitting 246 seated in a suitable aperture in the lower carriage frame member 228. The fitting 246 is in substantially wiping engagement with the clutch members 242 and 243 and is provided with a central aperture 247 in which is located a clutch ball 248 of a diameter substantially corresponding to that of the aperture 247 but with sufficient tolerance to permit of the ball moving freely axially of the aperture 247 from top to bottom of the fitting 246. In the position of the crank 240 as shown in Figs. 19A and 20A, the aperture 247 is capped by the overlying arcuate movable clutch member 242 and the clutch ball 248 is seated in the aperture 245 in the lower stationary clutch member 243. Thus, the lower frame member 228 and the clamping unit carriage is locked securely to the stationary bracket 220 whereas the crank 240 may be rotated in a counterclockwise direction from the position shown in Fig. 19A since the clutch ball 248 offers only rolling frictional resistance to the clutch member 242 which it contacts. Thus counterclockwise movement of the crank 240 is effected by the rotation of the shaft 226 to which the crank 240 is keyed by the key 249 and continues until such time as the clutch member 242 is moved into a position wherein the opening 244 therein is directly above the opening 247 in the annular fitting 246. At this point, the clutch ball 248 is urged upwardly by a spring pressed pin 250' reciprocably mounted in the lower bracket arm 250, until the clutch ball is seated in the opening 244 against or substantially against the undersurface of the crank 240. In this condition the crank is no longer free to move relative to the lower carriage frame member 228 whereas the latter by reason of the dislodgment of the clutch ball from the aperture 245 is now free to rotate in a counterclockwise direction locked to the shaft 226. Hence, continued rotation of the shaft 226 in a counterclockwise direction will effect complete retraction of the clamping unit 8 to the fully retracted position thereof shown in solid lines in Fig. 19B.

This counterclockwise rotation of the shaft 226 is preferably effected by means of a helical spring 251 (Fig. 20A) coaxial with the shaft 226 and connected thereto at its upper end and to a stationary cam housing structure 252 carried by the mounting plate 221 at a suitable location below the clamping unit 8. The shaft 226 is journalled at its lower end in the housing 252 and carries a pinion gear 253 secured thereto for rotation therewith, the gear 253 being operatively engaged by a segmental gear 254 fixedly mounted on and concentrically of a shaft 255 suitably journalled at its upper and lower ends in the housing 252. The shafts 226 and 255 have parallel axes of rotation and are each parallel to a cam shaft 256 journalled in the housing 252 and carrying a cam 257 whose rim of suitable contour provides a camming surface upon which a cam follower 258 carried by the segmental gear 254, rides and is driven by the cam so as to actuate the clamping unit 8 and hence the clamping member 231 through its prescribed compound movement into wrapping and clamping engagement with the fixed mandrel 3.

It should be understood that the rotational axis of the clamping unit drive shaft 226 is a generating element of a cone concentric with but a larger diameter than the cone of which the frusto-conical surface 160 of the fixed mandrel 3 is a part. This relationship of the drive shaft axes of the clamping units 8 and 9 to the elements of the conical surface of the mandrel 3 is depicted in Figs. 20B and 20C, the former corresponding to the front view of the cup-making machine as shown in Fig. 2, and the latter corresponding to the side view of the machine as shown in Fig. 1. However, it should be clearly understood that the geometrical relationship referred to above with respect to the Figs. 20B and 20C has not been followed in the showing of the clamping units 8 and 9 in Figs. 1 and 3 for the very good reason that to have done so would have rendered the showing of these units in the assembly of Figs. 1 to 3 inclusive most difficult because of the perspective problem arising from the small scale used in the assembly showing of these figures. Hence, the mounting plates 221 of the respective clamping units 8 and 9 in these figures are shown as vertically disposed in side elevation as are the rotational axes of the drive shafts 226.

The cam shafts 256 and 256' of the respective clamping units 8 and 9 are adapted to be driven continuously by the main electric driving motor 137 operating through a suitable gear train. As here preferably embodied, the same pinion gear 136 (Fig. 3) which drives the wrapper blank transfer arm 110 through the shafts 135, 132, 126 and 128, in that order, is used to turn a bevel gear 260 on the shaft 135, the gear 260 in turn driving a bevel gear 261 on a shaft 262 journalled for rotation in upper and lower bearings 263 and 264 respectively. The shaft 262 is provided at its lower end with a spur gear 265 which meshes with and drives a spur gear 266 on a shaft 267 connected at its upper end to the cam shaft 256 of the clamping unit 8. A bevel gear 268 carried by the shaft 267 meshes with a bevel gear 269 on one end of a horizontal cross shaft 270 which at its other end carries a bevel gear 271 meshing in turn with a bevel gear 272 on a vertical shaft 273. The shaft 273 also carries a spur gear 274 meshing with a spur gear 275 on a vertical shaft 276 connected to the cam shaft 256 of the clamping unit 9. Thus, the cams 257 and 257' for driving the clamping units 8 and 9, respectively, are in continuous rotation, their respective camming surfaces being chosen so as to effect the desired sequential movements of the respective clamping members 231 and 231' of the clamping units 8 and 9, respectively, in proper timed relation to the application of the bottom blank and the wrapper blank to the fixed mandrel 3 and to the sealing and rim rolling operations.

The clamping member 231 has an inner clamping surface 280 which is a frusto-conical surface of revolution complementary to the outer conical surface of the wrapper blank when in wrapped position on the fixed mandrel 3. The surface 280 is of a length from top to bottom of the clamping member 231 corresponding to the length of generating line of the mandrel 3. The clamping member 231 is of a configuration at its top to provide an arcuate rim 281 (Fig. 20D) which together with the corresponding rim 281' on the other clamping member 231' forms a conical seat circular in plan adapted to be telescopically engaged by the bottom-crimping unit 10 (Fig. 2) in one phase of the cup-forming operation and thereby lock the two clamping members 231 and 231' together for holding the wrapper blank 101 on the mandrel firmly during the side seam sealing, bottom crimping and rim rolling operations to be described more fully hereinafter. Each clamping member carries a hinge leaf 282 secured at the top to a mounting flange 283 and at the bottom to a mounting flange 284, each hinge leaf 282 being hinged to the cantilever arm 230 by means of the shaft or hinge pintle 232 above mentioned. The hinge leaf 282 comprises a row of parallel fingers 285 each having a surface configuration which faires smoothly into and constitutes part of the conical inner surface 280 of the clamping member 231. The cantilever arm 230 forms the other leaf of the hinge and terminates in a series of hinge fingers 286 intercalated with the hinge fingers 285 to permit the clamping member being swung on the pintle 232 in a clockwise direction, as viewed in Fig. 20D, between the clamping position there shown and the "open" position shown in Fig. 19B.

To this end also, the clamping member is suitably formed adjacent the hinge leaf 282 to provide slots 287 into which the hinge fingers 286 extend when the clamping member is swung to the open position. A flexible pressure plate 288 carried by the arm 230 terminates in a pair of curved flexible fingers 289 which extend into the top and bottom slots 28 on the clamping unit for the purpose of engaging the wrapper blank 101 and assisting the leading edge portion of the hinge leaf 282 in initially fairing the wrapper blank on the mandrel. Preferably, a thin lip member 290, Figs. 19B and C, is mounted on the trailing edge of clamping member 231' of the clamping unit 9 for holding the trailing edge of the wrapper blank in firm overlapping relation to the leading edge of the wrapper blank in fully clamped position of the blank, as shown in Fig. 19D, and also to serve as a medium for transferring the sealing heat from the sealing arm 11 to the overlap of the wrapper blank during the side seam sealing operation. The lip member 290 shown in Figs. 19B, C and D terminates at or substantially at, the bottom edge of the clamping member 231'. Likewise, the respective bottom edges of the clamping members 231 and 231' terminate, as shown in Figs. 20A and 21, at the bottom edge of the mandrel. However, the wrapper blank 101, when in position on the mandrel, does extend beyond the bottom edge of the mandrel as is also shown in Figs. 20A and 21, and as has been described above. This extended portion of the wrapper blank is backed up by the anvil face 199 of the retractable anvil 194 during the time the heating shoe 12' of the sealing arm 12 is in direct contact with this extended portion during sealing thereof as in Fig. 21. Inasmuch as both the sealing arm 12 and the anvil member 194 are retractable so as to leave the extended portion free to be operated on during the subsequent rim-rolling operation, it follows that the lip member 290 should not and does not overlie this extended portion. The lip member 290 does, however, overlie the overlap of the wrapper blank during the sealing of this overlap by the sealing shoe 11' of the sealing arm 11. The position of the sealing arm 11 and the wrapper blank during this latter operation is depicted in Fig. 22 but, in view of the fact that only a cut-away portion of the clamping member 231 is shown in Figs. 21 and 22 and that the clamping member 231' is, in the interest of clarity, not shown at all in either view, the lip member 290 does not appear in either figure. It will be understood however that when employed, as indicated in Figs. 19B–D, the lip member would be interposed between the sealing shoe 11' and the wrapper blank in the position of the parts shown in Fig. 22.

As will be apparent from Fig. 19D, the clamping members 231 in their fully clamped position as there shown are dimensioned circumferentially to clamp the wrapper blank over the whole circumference of the mandrel, except for a length-wise strip constituted by the overlapping portion 291 of the wrapper blank. Advantageously the overlap is in the order of three-eighths of an inch or smaller depending on the thickness of the wrapper blank, its stiffness, and the area of bonded surface deemed necessary for a satisfactory finished cup. At this moment of the time cycle, with the bottom blank in position on the piston 162 and the latter in fully retracted position at the bottom of the cavity 167, as in Fig. 32, and with the wrapper blank 101 clamped to the mandrel surface 160, as in Fig. 19D, the piston is moved upwardly by the piston cam 166 from the position shown in Fig. 32 to the position shown in Fig. 31 thus moving the bottom blank 15 axially upwardly relative to the wrapper blank 101 into its final position wherein and whereby the rim 16 of the bottom blank is coned inwardly into tight-fitting engagement throughout its entire circumferential area, with the wrapper blank. This relationship of the bottom blank and the wrapper blank, is best shown in Fig. 24A. Three individual operations thereafter start, which are then performed simultaneously, namely:

(1) The crimping of the bottom;
(2) The sealing of the side seam; and
(3) The rolling of the rim bead.

Figure 3:
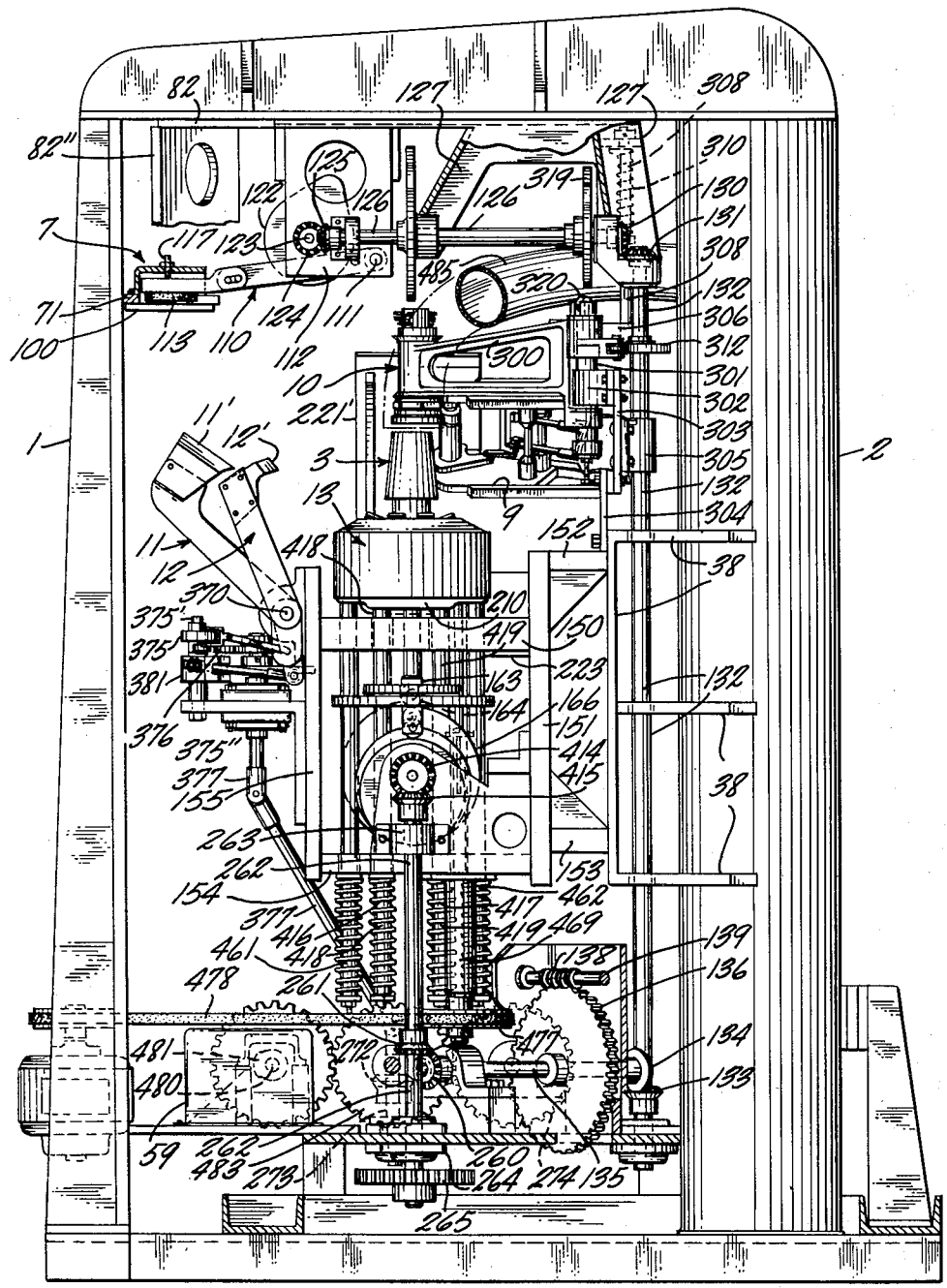
Fig. 3 is a view in section taken along the line 3—3 of Fig. 2.
Figures 4, 5:
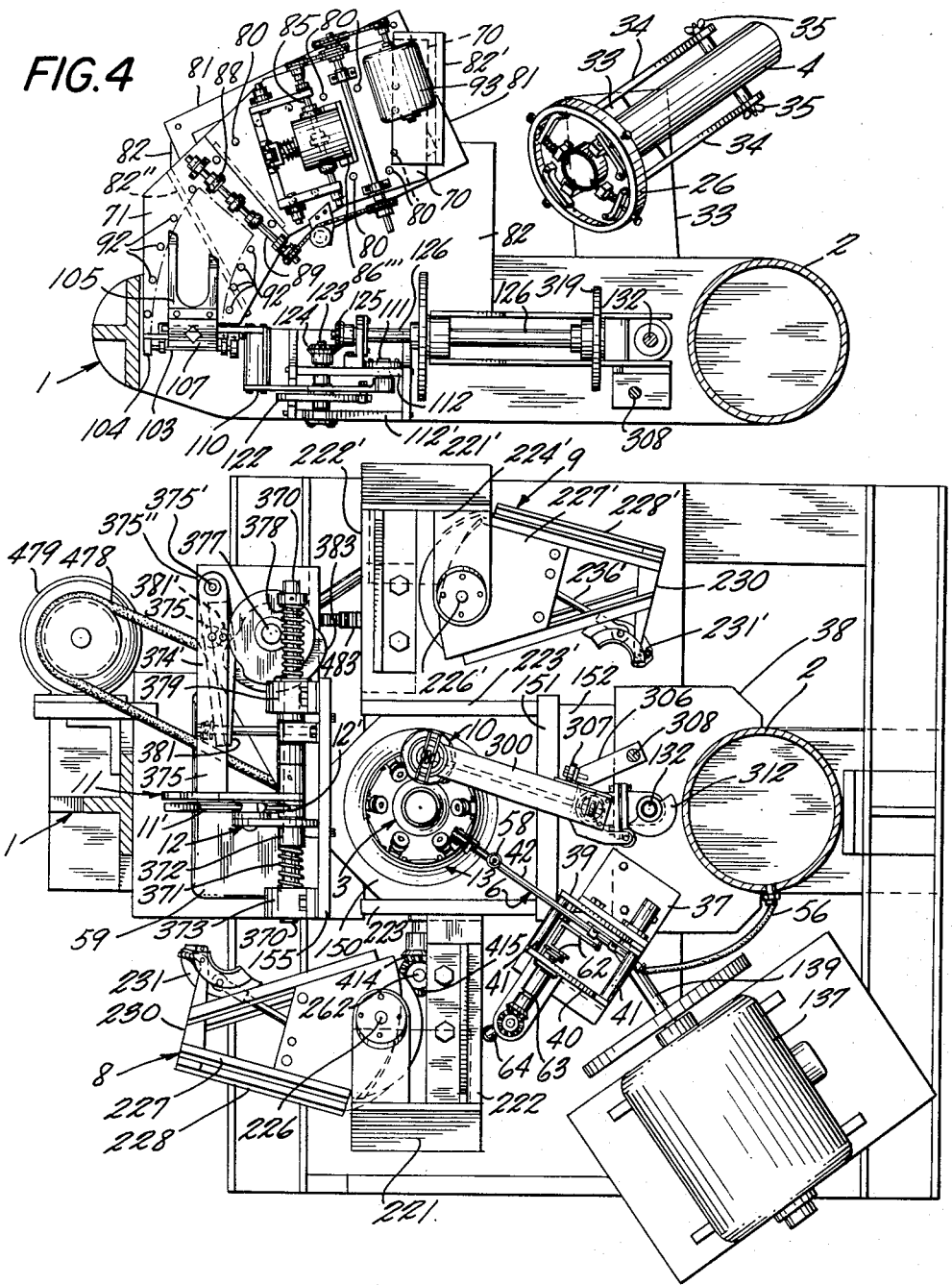
Fig. 4 is a view in section taken along the line 4—4 of Fig. 1.
Fig. 5 is a view in section taken along the line 5—5 of Fig. 1.
Figure 23:
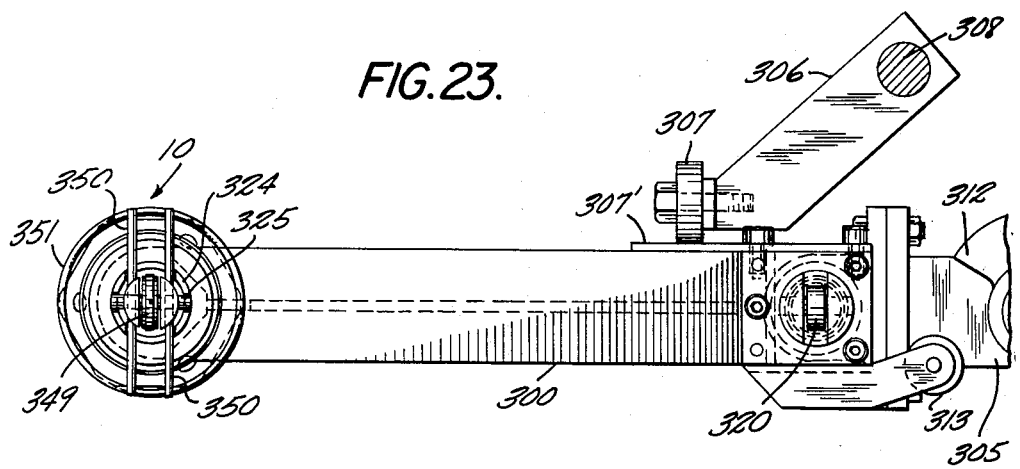
Fig. 23 is a somewhat enlarged view in plan of the cup bottom sealing unit of the machine shown in Fig. 21.

As to the crimping of the bottom, the crimping unit 10 (Fig. 2) comprises a cantilever arm 300 (Figs. 23 and 24A) which is journalled on a vertically disposed hollow shaft 301 for limited angular movement in a horizontal plane from a retracted position wherein the crimping unit is entirely clear of the working area over the mandrel, as in Figs. 2 and 5, to a working position directly over the mandrel, as in Figs. 23 to 24E inclusive. The shaft 301 is rigidly supported in a hangar 302, Fig. 24A, secured to the upper end of a vertically disposed mounting plate 303 which is secured to and carried by a second mounting plate 304 (Fig. 3) secured firmly and fixedly in turn to the bracket structure 38. Advantageously, the mounting plate 303 is further immobilized by means of a hangar 305 (Fig. 3) secured thereto and forming an intermediate journal bearing for the vertical shaft 132 (Fig. 3) which drives the wrapper blank transfer arm 110.

The cantilever crimping arm 300 at the start of the cup-making cycle as shown in Fig. 5, is positively held out of the working area by a cam 312 which holds the arm retracted against the counteraction of a spring-actuated torque arm 306 operative to swing the arm 300 on the shaft 301 in a counterclockwise direction as viewed in Fig. 5. The torque arm 306 carries a roller 307 at one end and is secured at the other end to a vertical shaft 308 (Fig. 5) mounted for oscillation on its axis in a hangar 309 (Fig. 2) secured to the shaft hangar 127. A helical spring 310 concentric with the torque shaft 308 is secured at its upper end to the hangar 309 and its lower end to the shaft, for opposing rotation of the arm 306 and the shaft 308 in a clockwise direction. The roller 307 presses upon a vertically disposed bed plate 307' carried by the arm 300, being in rolling engagement with the bed plate as respects vertical movement of the arm 300 and in sliding engagement with the bed plate as respects swinging movement of the arm 300.

The cam 312 of suitable circumferential contour is fixedly mounted on the continuously rotating vertical shaft 132. A cam follower 313 carried by the arm 300 is released by the cam 312 at the proper phase of the time cycle and thereby permits the torque arm 306 to displace the arm 300 in a clockwise direction, from its starting position, as viewed in Fig. 5, to its position over the mandrel as seen in Fig. 23, and to hold it there until completion of the bottom crimping operation, whereupon the arm is returned by the cam 312 to its starting position.

Subsequent to the movement in azimuth of the arm 300 to the position shown in Fig. 24A, the arm is adapted to be moved vertically downward on the shaft 301 into bottom-crimping position with relation to the mandrel 3. To this end, the hollow shaft 301 is provided internally with a helical spring 314 whose upper end bears against a suitable anti-friction thrust bearing 315 carried by the arm and whose lower end rests upon and is supported by a vertically adjustable bearing member 316 telescopically received within the shaft 301. Preferably, the bearing member 316 is carried at the upper end of an axially adjustable bolt 317 threadedly engaging a closure cap 318 secured in turn to the bottom of the hollow shaft 301. Thus, by turning the bolt 317 the support 316 may be moved axially of the shaft 301 to increase or decrease the upward pressure exerted by the spring 314 on the arm 300 and thus the rapidity with which the arm will be lifted upwardly relative to the mandrel on completion of the crimping operation.

A suitably contoured cam 319 fixedly secured to the overhead cam shaft 126 is designed to engage a cam follower 320 on the arm 300 at the proper time in the operating cycle and to move the arm vertically downwardly against the resistance offered by the spring 314, from the position shown in Fig. 24A to the crimping position shown in Fig. 24B, and to hold it in the latter until bottom crimping of the cup has been completed.

A concentric multiple die arrangement is provided at the free end of the cantilever arm 300 and is brought into position coaxially with the mandrel 3 by the arm 300. To this end, the free end of the arm is fashioned to provide a hollow fitting 321 having a bore 322 of cylindrical configuration disposed with its cylinder axis vertical. A sleeve 323, also cylindrical, is snugly mounted within the bore 322 from which it extends at the top to provide a fixed upstanding angular guide portion 324 slotted at diametrically opposite points to provide a pair of vertically extending guide-ways 325. The sleeve also extends from the bore at the bottom whereat it is expanded diametrically to provide an enlarged cylindrical skirt portion 326 abutting the lower end of the fitting 321. A nut 321' threadedly engages the sleeve 323 at its top and abuts the top of the fitting 321 thus locking the sleeve securely in the bore.

The sleeve skirt 326 serves as a mounting for an annular die member 327 which is preferably threadedly removably secured to the skirt concentrically externally thereof. Preferably also, a cylindrical thermal insulting members 328 concentric with the skirt 326 is disposed at the inner side of the skirt in closely annularly spaced relation thereto whereat it is held by an integral annular flange 329 extending radially outwardly and clamped between the skirt end and an annular seat 330 on the die member 327.

The die member 327 is circumferentially recessed to provide an annular chamber 331 for an electrical heating element 332, the chamber being capped by a removable closure strip 333. The bottom of the die member is of a configuration to provide a stepped surface portion 334 complementary to the top rim 281 of the clamping members 231 and a portion at least of the top mounting flange 283 of the clamping member. Thus, when the arm 300 is moved downwardly from the starting position shown in Fig. 24A to the rim-crimping position shown in Figs. 24B to 24E inclusive, the die member 327 will lock the wrapping and clamping members 231 securely in place, and simultaneously establish concentricity between the mandrel and the mutiple die assembly.

The inner face of the annular die member 327 tapers upwardly from the inner margin of the stepped surface portion 324 of the die member to provide an inner conical surface portion 335 which constitutes, in effect, an extension of the inner conical surface of the wrapping and clamping members 231 in their locked position as in Fig. 24B. The surface portion 335 terminates at its top in a radially inwardly extending annular shoulder portion 336 which in the course of the downward movement member 327, engages the projecting upper end of the wrapper blank 101 and folds it inwardly over the rim 16 of the bottom blank 15 stationed on the mandrel.

The cavity 337 formed by the skirt 326 and the die member 327 houses a folding piston 338 concentric therewith and a diameter substantially conforming to the inside diameter of the die member 327 in the portion 339 thereof immediately above the folding shoulder 336. Preferably the portion 339 is of cylindrical contour.

The piston 338 is centrally apertured as at 340 and is preferably integral with a smaller diameter relatively short tubular sleeve 341 extending upwardly therefrom in concentric relation thereto. The sleeve 341 is housed telescopically, snugly and fixedly in a second tubular sleeve 342 concentric therewith and having an inner annular shoulder 343 against which the sleeve 341 abuts and is seated at its upper end. The sleeve 342 at its upper end is also provided with a circumferentially extending flange 344 upon which a helical spring 345 is supported concentrically thereof. The tubular sleeves 341 and 342 together form, in effect, a unitary piston rod for the piston 338.

A piston-actuating plunger 346 is positioned above the helical spring 345 concentric therewith and with the piston 338 and is provided at its upper end with a bifurcated cam follower support 347 in whose bifurcations is mounted a cam follower shaft 348 threadedly received therein and extending to either side thereof into the guideways 325 of the sleeve 324. This arrangement of the cam follower shaft in the guideways ensures that the movement of the plunger 346 will be confined to movement axially of the sleeve 323, and rotataion prevented. A cam follower in the form of a roller 349 is journalled on the shaft 348 for engagement over a proper phase of the operating cycle by the bottom crimping unit actuating cam 122 which is fixed to the cam shaft 126. It will be understood that the cam 122 is of a circumferential configuration to provide the desired downward movement of the plunger and hence of the piston 338 through the sequence of positions illustrated in Figures 24B to 24D inclusive so as to complete the folding of the wrapper blank extension over the rim 16 of the bottom blank 15 in position on the piston 162 of the mandrel 3. The bifurcations of the plunger portion 347 serve also to carry a pair of spring retaining pins 350 between which and the fitting nut 321' is disposed a helical spring 351 serving to hold the plunger 346 in its uppermost position, as depicted in Fig. 24B, until the plunger is moved downwardly by the cam 122. It will be observed that the plunger 346 being hollow provides an exit passageway for the escape of air from the portion of the cavity 337 which is below the piston 338, via the aperture 340 in the piston and the concentric piston sleeves 341 and 342.

A cylindrical sleeve 352 concentric with the plunger 346 is securely fixedly at its upper end to the plunger and snugly encases the helical spring 345 and the piston sleeve 343, being in slidable engagement with the latter whereby relative axial movement between the sleeves 352 and 342 is made possible. The sleeve 352 is limited in its upward movement relative to the sleeve 342 by a shoulder 353 extending circumferentially internally of the sleeve 352 and normally seated against the circumferentially extending flange 344 at the upper end of the sleeve 342. Thus, the action of the helical spring 351 in holding the plunger 346 in the starting position shown in Fig. 24A will result in the sleeve 352 holding the piston 338 in the starting position thereof also shown in Fig. 24A.

A sliding bushing 354 of tubular sleeve form and concentric with the piston plunger 346 is secured fixedly to the plunger at its upper end and fixedly to the sleeve 352 at its lower end and is slidably telescopically mounted in the outer die sleeve 323 so as to provide a suitable anti-friction bearing between the inner and outer multiple die members.

The casing sleeve 352 terminates at its lower end in a sealing piston 355 having an annular seat 356 in which is removably seated an annular removably compression member 357 having a conical surface portion 358 which in turn provides a seat for an annular radial sealing member 359 disposed between the upper piston 355 and the lower piston 338. The removable compression member 357 is locked to the sealing piston 355 by a stud screw 360 threadedly engaging the piston 355 and extending into the compression member 357 which latter is provided with a recess 361 into which the stud screw projects. Preferably, an access opening 362 is provided in the skirt 326 of the sleeve 323 to permit of the removal of the locking screw 360 so as to free the compression member 357 and hence the expansible ring member 359 from the upper piston 355. As a result, it will be apparent that by unscrewing the lower piston 338 from the sleeve 342 which it preferably threadedly engages, it will be possible to remove and replace the expansible sealing ring 359 from the lower end of the crimping unit without further disassembly of the multiple die unit.

In the operation of the rim crimping unit, the concentric multiple die head is moved into position over the mandrel by the releasing action of the cam 312 on the cam follower 313 thus permitting moving of the arm 300 horizontally on the axis of the hollow shaft 301. The rotation of the cam 319 ultimately brings its camming surface into contact with the cam follower 320 at the proper time, moving the arm 300 and thus the multiple die head axially downwardly of the shaft 301 until the bottom of the folding die 327 contacts the top of the wrapping and clamping members 231 as shown in Fig. 24B. This results in the inward folding of the extending portion of the wrapper blank 101 over the upstanding rim 16 of the bottom blank 15 as a result of the creasing action of the folding shoulder 336 of the folding die 327, the folded position of the extension at this moment being shown in Fig. 24B. At this moment, the continuously moving cam 122 engages the plunger follower 349 forcing the plunger 346 downwardly into contact with the helical spring 345 which in turn moves the piston sleeves 341 and 342 and folding piston 338 downwardly into contact with the inwardly folded wrapper blank extension until the bottom of the piston 338 is seated on the upper surface of the bottom blank 15. During this downward movement and because of the annular flange 344, the compressing piston 357 and its tubular piston sleeve 352 move with the bottom folding piston 338 as a unit. With the bottom or folding piston 338 seated on the bottom blank 15, further movement of the piston 338 is prevetend. However, the plunger 346 continues to move down against the resistance offered by the helical spring 345 which is compressed between the shoulder 344 on the sleeve 342, and the bottom of the plunger. The plunger in its continued downward movement causes the piston sleeve 352 carrying the sealing or compressing piston 355 to move downward relative to the piston 338, from the position shown in Fig. 24D to the terminal position shown in Fig. 24E. This final downward movement compresses the annular resilient sealing member 359 between the upper and lower pistons and causes it to expand radially outwardly so as to press the folded extention of the wrapper blank tightly against the upstanding rim 15 of the bottom blank. This radial expansion of the resilient sealing member 359 is accentuated by the conical surface portion 358 of the radial compressing member 357, the net result being that a very powerful clamping of wrapper-bottom blank fold between the rigid die member 327 and the resilient die member 359 is obtained. With the parts in the position shown in Fig. 24E, heat supplied to the fold by the heating elements 332 through the rigid die 327 serves to heat and cure the adhesive with which the marginal contacting portions of the wrapper blank and bottom blank were initially coated, and thus effectively securely to bond and seal the two surfaces to each other around the bottom of the cup. After a determined dwell period provided by the cam 122, the plunger 347 is caused to move upwardly by the restoring action of the helical spring 351 and coil spring 345 as a result of which the several dies operating in reverse order are restored to their initial position. As a final step in the operation the arm 300 is moved upwardly by the restoring action of the spring 314 as the arm is freed by the continued rotation of the cam 319 and, finally, the arm is swung out of the working area by the cam 312.

As to sealing of the side seam of the cup, the pair of sealing arms 11 and 12 are carried by and axially of a shaft 370 and are adapted to be swung in a vertical plane from a fully retracted position as shown in Fig. 3 successively into contact with the exposed overlap portion of the wrapper blank between the adjoining ends of the respective wrapping and clamping units 231 and 231' in their locked position around the mandrel 3. Each of the sealing arms is provided at its outer end with a thermostatically controlled electrically heated heating shoe 11' and 12' respectively disposed and arranged on the arms to make substantially line contact with the overlapped portion of the wrapper blank when brought into engagement therewith. It will be noted from Fig. 21 that the sealing arm 12 is actuated first and brought into engagement with the wrapper blank so as to bear thereupon and press the wrapper blank firmly against the anvil face 199 of the pivoted anvil member 194 held firmly against inward movement by the anvil camming and locking roller 200. Prior to the movement of the sealing arm 12 from its position of rest as shown in Fig. 3 to its sealing position shown in Fig. 21, the anvil sleeve 205 will have been moved downwardly at the completion of the wrapping operation from its extended position, as in Fig. 31, to the retracted position shown in Fig. 21 and in Fig. 32. The sealing arm 12 is journalled on the horizontal shaft 370 for angular movement relative thereto toward the mandrel 3, against the restraining action of a helical spring 371 fixed at its one end to the bearing hub 372 of the sealing arm and fixed at its other end to the journal bearing unit 373 supporting the shaft 370. The angular movement of the arm 12 is effected by a suitable linkage 374 suitably connecting arm 12 to a cam-actuated lever 374' provided with a cam follower unit 375, the lever being mounted for horizontal pivotal movement on a shaft 375' mounted on a bracket 375". The lever 374' is actuated in turn by a cam 376 mounted on and rotatable with a cam shaft 377 continuously driven by the main motor 137 through the gear train 268–272 inclusive. The cam 376 is of a contour to bring the electrically heated, thermostatically controlled heating shoe 12' into sealing contact with the overlap 291 of the wrapper blank on the mandrel, hold it there under optimum sealing pressure for a period of time to effect the necessary bond, and to permit the arm to be restored to its initial position by the restoring action of the helical spring 371 during the course of the bottom crimping and rim sealing operations being performed simultaneously therewith.

At or about the time when the sealing arm 12 commences its return movement from the sealing position shown in Fig. 21 to its starting position shown in Fig. 22, the sealing arm 11, which is pin connected to the shaft 370 for rotation therewith, commences its movement from the position shown in Fig. 21 to its sealing contact position shown in Fig. 22. This movement is carried out against the restraining action of a helical spring 378 (Fig. 5) coaxial with the shaft 370 and secured at one end to a bearing unit 379 carried by the mounting plate 155 and also supporting the shaft 370, and secured at its other end to the shaft 370. The angular movement of the arm 11 is effected by a suitable adjustable linkage 380 suitably connecting the arm 11 to a cam-actuated lever 381 through a helical compression spring 382 coaxial with the linkage 380. The helical spring 382 serves to cushion the impact of the heating shoe 11' of the arm 11 as it comes into contact with the wrapper blank on the mandrel and to permit of a gradual build-up of the sealing pressure to the optimum value. The lever 381 is actuated by a cam 383 of suitable contour which is engaged by a follower 381' on the lever 381 and is mounted on the shaft 377 coaxial with the cam 376 and rotates continuously with the cam shaft. The contour of the cam 383 is also such as to provide the properly timed angular movement of the sealing arm 11 from the position shown in Fig. 21 to the sealing position shown in Fig. 22, to maintain the necessary dwell during the heating and curing operation performed on the adhesively coated overlap portion 291 of the wrapper blank, and to permit of the arm 11 being restored to its starting position by the helical spring 378.

As to the rim spinning operation, and with particular reference to Figs. 25 to 29 inclusive, the annular anvil sleeve support plate 210 (Figs. 26 and 31) which threadedly receives the bottom end of the anvil-actuating sleeve 205 is carried removably at the upper end of a pair of cam follower push rods 400 and 401 disposed at diametrically opposite sides of the mandrel and passing through suitable apertures 402 and 403 respectively in the main mandrel support plate 150. The push rods are held in spaced apart parallel relation to each other below the support plate 150 by means of a spacing plate 404 suitably apertured for the passage of the push rods therethrough and fixedly secured to the push rods by set screws 405 and 406 respectively. The spacing plate 404 is also suitably centrally apertured as at 407 (Fig. 29) for the passage therethrough of the follower 187 of the mandrel piston rod 163.

The support plate push rods 400 and 401 are provided at their lower ends with cam followers in the form of rollers 408 and 409, respectively, which are adapted for engagement with and by cams 410 and 411 respectively coaxially mounted on a strong and rigid cam shaft 412 journalled at its ends for rotation in a U-shaped rigid bracket structure 413 suitably supported and fixedly secured to the main frame 151. The cam shaft 412 is provided at its right hand end as viewed in Fig. 2 with a bevel gear 414 which meshes with a bevel gear 415 on the upper end of the vertical cam-drive-shaft 262 as shown in Fig. 2. Thus, the main driving motor 137 operating through the worm and pinion gears 138 and 136 respectively and thence through the gears 260 and 261 continuously drives the cam shaft 412 and thus the anvil sleeve cams 410 and 411. The cams 410 and 411 are of a configuration such that at the beginning of the operating cycle they will preferably be out of contact with the cam followers 408 and 409 respectively, as shown in Figs. 2 and 26. The annular anvil sleeve support plate 210 will therefore be in its lowermost or retracted position closest to the main mandrel support plate 150 as shown in Fig. 26. In this position the anvil sleeve 205 is fully lowered, the anvil member 194 is in extended side seam sealing position, the mandrel piston 162 is retracted, and the wrapping and clamping operation may be carried out. This retracted position of the support plate 210 and the sleeve 205 is yieldably maintained by means of a pair of helical springs 416 and 417 (Fig. 3) disposed below the U-shaped cam shaft bracket 413 and mounted on and coaxially of a pair of support plate return rods 418 and 419, respectively, which are fixedly secured at their upper ends to the support plate 210, pass downwardly through suitable apertures in the mandrel support plate 150, the spacing plate 404 and the U-shaped cam shaft supporting bracket 413 to a suitable distance below the latter. The helical return springs 416 and 417 are suitably connected between the bracket 413 and the bottom ends of the return rods 418 and 419, respectively, to maintain these rods under a constant tension and thus yieldably hold the support plate 210 in its lowermost position as shown in Fig. 26. Set screws 420 and 421 (Fig. 29) threadedly engaging the spacing plate 404 serve to lock the spacing plate to the return rods 418 and 419 respectively as best appears in Fig. 29.

The support plate 210 carries the spinning roller turret unit 13 and to this end an annular anti-friction bearing unit (Figs. 26 and 27), is supported on the plate 210 concentrically of the anvil actuating sleeve 205. Directly above the bearing unit 425 is a cylindrical stationary bearing sleeve 426 which snugly engages the anvil sleeve 205 concentrically thereof and is provided at its upper end with an inwardly extending circumferential flange 427 disposed in overlying contacting relation to a circumferential shoulder 428 on the sleeve 205 so that the sleeve 426 is suspended from the shoulder 428. A second rotatable sleeve 429 of suitably larger diameter and concentric with the stationary sleeve 426 is mounted for rotation relative thereto on upper and lower spaced apart roller bearings 430 and 431 respectively (Fig. 26), the lower bearing 431 being retained in the annular space between the sleeves 426 and 429 by an annular retaining ring 432 threadedly engaging the outer surface of the sleeve 426 in underlying relation to the bearing 432. The upper bearing 430 is maintained in vertically spaced relation to the lower bearing by inner and outer bearing support rings 433 and 434 respectively, the upper bearing 430 being restrained against upward movement by an inwardly extending circumferential shoulder 435 at the top of the outer sleeve 429.

A ring gear 436 concentric with the sleeve 429 is removably attached to the latter at its bottom end as by means of screws 437 and is provided with an inwardly extending radial flange portion 438 (Fig. 26) underlying the bearing 431, the ring gear 436 being resiliently circumferentially supported on the subjacent roller bearing 425 by means of a circular row of helical springs 439 each coaxially traversed by a locating pin 440 seated at its upper and lower ends respectively in recesses in the ring gear flange portion 438 and the upper raceway of the bearing 425, respectively. Thus, the outer cylindrical rotatable sleeve 429 is free to rotate relative to the inner sleeve 426 and at the same time is free to rotate relative to the annular support plate 210.

The outer sleeve 429 serves to support at its upper end identical sets of inner and outer rim-spinning rollers 441 and 442 respectively. As here preferably embodied six such sets of spinning rollers, equally circumferentially spaced from each other, are carried by the sleeve 429, being disposed radially of and around the anvil actuating sleeve 205, as has been shown in Fig. 25. The inner roller 441 of each such set is circumferentially grooved to receive a ring 443 of rubber or other suitable material of relatively high coefficient of friction. The roller 441 is mounted in relation to the anvil sleeve 205 so that the ring 443 is at all times in contact with the flange 211 at the top of the sleeve 205 and, as previously described, bodily movement of the roller 441 around the central vertical axis of the sleeve 205 will result in this roller being rotated on its own axis of revolution. A suitably contoured bead forming surface 444 terminating in a groove 444' is provided on the roller 441 circumferentially thereof for co-action with a complementary bead-forming surface 445 terminating in a groove 445' on the outer roller 442, the grooves 444' and 445' forming an opening when the rollers are in contact with each other, as in Fig. 28, corresponding in cross-section to that of the desired bead or roll 484 on the rim of the cup comprised of the moulded wrapper blank 101 on the mandrel 3. The inner roller 441 is mounted for rotation on its axis on a suitable anti-friction bearing 446 carried on an axle 447 secured to and radially of the sleeve 429.

The roller 442 is likewise mounted on a suitable anti-friction bearing 448 for rotation on an axle 449 carried by a tilt arm 450 pivotally mounted for tilting movement in a vertical plane on a trunnion bearing 451 secured to the sleeve 429. The tilt arm 450 pivots about a horizontal tilt axis provided by the bearing 451 so that the roller 445 is adapted to be moved into and out of contact with the roller 441 so as progressively to form the opening in which the bead or roll of the cup rim is to be formed. Means are provided for tilting the tilt arm 450 on the common axis of its horizontally disposed trunnion pins 451. To this end the roller axle 449 is provided at its outer end with a tilting roller 452 which is preferably of somewhat larger diameter than the spinning roller 442 and comprises a rim portion 452' of rubber or other suitable relatively non-slip material. The roller 452 of each set is adapted to be gradually elevated so as to tilt the arm 450 and thus gradually move the spinning roller 442 into engagement with the spinning roller 441. For this purpose an annular tilt member 453 having a suitably upwardly curved tilting surface portion 454 underlies and engages the tilting rollers 452 so that as the sleeve 429 is rotated about the anvil sleeve 205, the tilting rollers 452 will ride on the tilting surface 454. By elevating the tilt member 453, the tilt arms 450 will be gradually and smoothly tilted on their tilt axes 451 from the wrapping and clamping position shown in Fig. 26 to the rim-spinning position shown in Figs. 27 and 28.

The tilt member 453 is supported at diametrically opposite points by vertically movable push rods 455 and 456 which threadedly engage the unit 453 at their upper ends and are provided at their lower ends with cam followers 457 and 458 respectively, adapted to be engaged by cams 459 and 460, respectively, for raising the tilt member 453 at the proper phase of the operating cycle. The member 453 is yieldably restrained against upward movement by spring tensioned shafts 461 and 462 secured at their upper ends to the units 453 and passing downwardly through suitably aligned apertures in the anvil sleeve support plate 210, the main mandrel support plate 150, an outer centrally apertured spacing plate 463, and the cam shaft supporting bracket 413 to a suitable distance below the latter. Each of the shafts 461 and 462 is secured to the spacing plate 463 by set screws 464 and 465 respectively. Likewise, the push rods 455 and 456 of the tilt member are secured to the spacing plate 463 in desired parallel relation to each other, by means of set screws 466 and 467 respectively.

The spinning roller sleeve 429 with its ring gear 436 is adapted to be driven at a determined rotational speed by means of a spur gear 468 (Fig. 27) carried at the upper end of a shaft 469 which is journalled in a bearing 470 carried by the support plate 210. The shaft 469 extends downwardly through an aperture 471 in the main mandrel support 150, and through an aligned aperture 472 in the subjacent inner spacing plate 404. The lower end of the shaft 469 is telescopically slidably received in the upper end of a hollow shaft 473 which is vertically slotted as at 474 for the reception of a transverse pin 475 on the shaft 469 which serves to lock the shafts 469 and 474 together for axial rotation and yet permit the shaft 469 to move axially upwardly of the hollow shaft 473 as from the position shown in Fig. 26 to the rim-rolling position shown in Fig. 27. The hollow shaft 473 is journalled in a bearing member 476 secured to and disposed below the cam shaft bracket 413 and is provided at its lower end with a drive pulley 477 which is connected by a belt 478 to an electric motor 479 carried by the frame 1. The motor 479 may be controlled by suitable cam-actuated switch means (not shown) contained in the main control box 59 so as to rotate the spinning roller sleeve 429 at the proper instant in the operating cycle when the spinning roller sleeve is elevated by means of the push rods 400 and 401.

The main control-unit box 59 may be provided with a cam shaft 480 carrying any suitable number of cams 481 respectively operative to make and break electrical contacts (not shown) controlling air valving mechanisms for the purpose of actuating the several components of the machine in the necessary timed relation to each other and thereby properly to effect the various sequential and simultaneous operations to be performed, at the correct and related phases of the operating cycle. To this end, the shaft 480 is adapted to be driven continuously by a gear 482 which meshes with a gear 483 carried by and rotatable with the shaft 270 (Fig. 2) coupling and driving the wrapping and clamping units 8 and 9.

It will be apparent from Figs. 26 and 27 that as the spinning roller sleeve 429 is elevated to rim-spinning position by cams 410 and 411 acting through the push rods 400 and 401, there will be a simultaneous upward movement of the tilt member 453 by the cams 459 and 460 acting through the elevating rods 455 and 456, thereby to effect a simultaneous controlled angular inward movement of the spinning rollers 442 towards the spinning rollers 441. At the same time, the motor 479 having been set in operation, the rotation of the spinning roller sleeve 429 by the gear 468 acting on the ring gear 436 will cause the sets of spinning rollers carried by the sleeve 429 to revolve around the anvil sleeve 205. Thus, the spinning rollers 441 will be set into rotation as they travel on the spinning roller track flange 211 of the anvil actuating sleeve. As the sleeve 205 approaches the mandrel 3, it will effect the retraction of the anvil member 194, and the downwardly extending rim portion of the wrapper blank, still clamped on the mandrel 3, will enter the space between the spinning surfaces 444 and 445. As the controlled relative movement of the spinning rollers continues the shape of the opening formed by the roller recesses 444' and 445' progressively changes with a corresponding progressive change in the shape of the bead or roll 484 being formed on the rim of the wrapper blank 101. When the rollers contact each other as in Fig. 28 the opening between the recesses 444' and 445' will correspond to the cross-section of the desired bead or roll. After the completion of the roll the return movement of the support plate 210 to its original position as in Fig. 26 and the return movement of the spinning roller elevator unit 453 effects a relative motion of the spinning rollers of each set so as to free the completed bead and permit the withdrawal of the spinning head. Simultaneously with this withdrawal the wrapping and clamping units 8 and 9 are moved automatically outwardly out of the working area as is the bottom-crimping unit 10, thus permitting the completely formed cup to be ejected from the mandrel by an air blast issuing from the opening 185 in the mandrel piston 161. This air blast projects the finished cup from the mandrel into a suitably disposed and arranged curved guide tube 485 (Fig. 3) which, advantageously, may deliver the completed cup to a packing and storing container (not shown). The cycle is thereafter repeated.

The invention in its broader aspects is not limited to the specific steps, combinations, mechanisms and improvements described but departures may be made therefrom within the scope of the accompanying claims without departing from the principles of the invention and without sacrificing its chief advantages.

What is claimed is:

1. Apparatus for forming a thin-walled hollow body from a thin flexible sheet of mouldable material: comprising a stationary rigid mandrel having circumferentially thereof a moulding surface which is essentially a surface of revolution; means for releasably holding a sheet of said mouldable material to said moulding surface in a position in which one of a pair of opposite ends of said sheet is held in substantially tangential contact with said moulding surface along a generating line thereof, and the other is free; means for progressively wrapping said sheet from its held end to its free end, around said mandrel and for clamping said sheet firmly to said moulding surface throughout substantially the entire circumference of said mandrel, said sheet being a length such that in the wrapped position thereof said free end overlaps said held end; and, sealing means engageable with said sheet along the overlap, for sealingly joining the overlapping portions of said sheet.

2. Apparatus for forming a thin-walled hollow body from thin flexible sheet material, said body having a closed bottom portion: comprising a stationary rigid mandrel having, circumferentially thereof, a moulding surface to which said sheet material is applied in the form of a wrapper blank, and having a separate surface to which said sheet material is applied in the form of a preformed dish-shaped bottom blank, said moulding surface being essentially a surface of revolution; means for applying a bottom blank to said separate surface and for releasably holding said blank in contact therewith; means for applying a wrapper blank to said mandrel and for releasably holding said wrapper blank in contact therewith in a position in which a portion of the wrapper blank extends beyond said bottom blank, and in which one of a pair of opposite ends of said wrapper blank is held in substantially tangential contact with said moulding surface along a generating line thereof, and the other is free; means for progressively wrapping said wrapper blank from its held end to its free end, around said mandrel and for clamping said wrapper blank firmly to said moulding surface through substantially the entire circumference of said mandrel, said wrapper blank being of a length such that, when wrapped, said free end overlaps said held end; means for sealing by joining the extending portion of said wrapper blank to said bottom blank; and separate sealing means coacting with said mandrel and engageable with said wrapper blank along the overlap, for sealingly joining the overlapping portions of said wrapper blank.

3. Apparatus for moulding a thin-walled hollow body from a thin flexible sheet of mouldable material comprising a stationary mandrel having, circumferentially thereof, a moulding surface which is essentially a surface of revolution; means for holding a sheet of said mouldable material in a position relative to said mandrel in which one of a pair of opposite ends of said sheet is held in substantially tangential contacting engagement with said moulding surface along a generating line thereof, and the other is free; means for progressively wrapping said sheet in a direction outwardly from its held end toward its free end, circumferentially of said mandrel, and for moulding said sheet into substantial conformity with said moulding surface, said wrapping and moulding means comprising separate wrapping and clamping members each having a moulding surface which is a surface of revolution similar to, but of relative radius of revolution larger than, that of said mandrel; means for bodily moving said wrapping and clamping members successively and individually through separate paths into separate positions relative to said mandrel in each of which the moulding surface of the member is in substantially line contact with the outer surface of said sheet along a generating line of said moulding surface, and separate means for rotating each said wrapping and clamping member about an axis substantially parallel and close to said line of contact, into clamping engagement with said sheet on said mandrel.

4. Apparatus for making frusto-conical containers from thin flexible sheets of mouldable material, comprising a stationary mandrel having, circumferentially thereof, a frusto-conical moulding surface to be supplied with an arcuate wrapper blank of flexible sheet material and having a circular end surface to be supplied with a circular dished bottom blank of flexible sheet material; means for positioning and holding said dished bottom blank on said end surface; means for positioning and holding said arcuate wrapper blank in a position relative to said mandrel in which one of a pair of opposite ends of said wrapper blank is held in substantially tangential contacting engagement with said frusto-conical surface along a generating line thereof, and the other is free; means for progressively wrapping said wrapper blank from its held end to its free end, around said mandrel and for clamping said wrapper blank firmly to said frusto-conical surface throughout substantially the entire circumference of said mandrel, said wrapper blank being of a length and width such that in its clamped position its ends overlap and it encloses said dished bottom blank; sealing means engageable with the clamped wrapper blank along the overlap, for sealingly joining the overlapping ends of the clamped wrapper blank; a multiple die unit for sealingly joining the clamped wrapper blank along one rim thereof to the enclosed bottom blank; and, rim-spinning means movable axially of said mandrel for forming a bead on the other rim of the clamped wrapper blank.

5. The method of manufacturing a frusto-conical container from thin flexible sheets of mouldable material comprising providing a stationary mandrel having, circumferentially thereof, a frusto-conical moulding surface, and a circular end surface; positioning and holding a circular dished bottom blank on said end surface; positioning and holding an arcuate wrapper blank in a position relative to said mandrel in which one of a pair of opposite ends of said wrapper blank is held in substantially tangential contacting engagement with said frusto-conical surface along a generating line thereof, and the other is free; progressively wrapping said wrapper blank from its held end to its free end around said mandrel and clamping said wrapper blank firmly to said frusto-conical surface throughout substantially the entire circumference of said mandrel, said wrapper blank being of a length and width such that in the clamped position thereof its ends overlap and it encloses said dished bottom blank; sealingly joining the overlapping ends of the clamped wrapper blank; and, simultaneously sealingly joining the clamped wrapper blank along one of its rims to the enclosed dished bottom blank, and forming a bead on the other.

6. Apparatus for forming paper cups, comprising a stationary rigid mandrel having, circumferentially thereof, a fixed moulding surface to which a paper wrapper blank is to be applied, and having an axially-movable end surface to which a pre-formed dish-shaped paper bottom blank is to be applied, said moulding surface being essentially a surface of revolution; means for applying said bottom blank to said end surface and for releasably holding said blank in contact therewith; means for applying said wrapper blank to said mandrel and for releasably holding said wrapper blank in contact therewith in a position in which a portion of the wrapper blank extends beyond said bottom blank, and in which one of a pair of opposite ends of said wrapper blank is held in substantially tangential contact with said moulding surface along a generating line thereof, and the other is free; separate wrapping and clamping members for progressively wrapping said wrapper blank from its held end to its free end, circumferentially of said mandrel, and for moulding said wrapper blank into substantial conformity with said moulding surface throughout substantially the entire circumference of said mandrel, each said member having a moulding surface which is a surface of revolution similar to, but of relative radius of revolution larger than, that of said mandrel, and said wrapper blank being of a length and width such that, when wrapped, it surrounds said bottom blank, and said free end overlaps said held end; means for bodily swinging said wrapping and clamping members successively and individually on separate axes and through separate paths into separate positions relative to said mandrel in each of which the moulding surface of the member contacts the wrapper blank along a line of first contact paralleling a generating line of the mandrel moulding surface, each said axes being parallel to the line of first contact of its wrapping and clamping member with said wrapper blank; separate means for rotating each said wrapping and clamping member on an axis substantially parallel and close to its said line of first contact, into clamping engagement with said wrapper blank on said mandrel; means for moving said mandrel end surface axially of said mandrel to move said bottom blank axially of said wrapper blank into closely fitting circumferential engagement with the extending portion of said wrapper blank; sealing means movable into firm contacting engagement with the wrapper blank when clamped, for sealingly joining the overlapping ends of the clamped wrapper blank; a multiple die unit mounted for movement axially of said mandrel into locked telescoping engagement with said wrapping and clamping members in their clamped position, for crimping and sealingly joining the extending portion of said wrapper blank to the rim of the enclosed bottom blank; and, rim-spinning means movable axially of and circumferentially of said mandrel for forming a bead on the rim of the clamped wrapper blank.

7. Apparatus for making containers from thin flexible sheet material comprising: a mandrel having, circumferentially thereof, a moulding surface and having an axially-movable end surface for forming an end recess in said mandrel; means for applying said sheet material to said end surface in the form of a pre-treated dished bottom blank having an inclined rim portion and a layer of protective material on each of its opposite faces; means for seating said bottom blank in said end recess on said axially-movable end surface; means for applying said sheet material to said moulding surface in the form of a pre-treated wrapper blank having its opposite faces bounded by pairs of opposite edges, having a layer of protective material on each of its opposite faces, and having a strip of adhesive marginally of one of said faces along one edge of each pair of said pairs of opposite edges; means for wrapping said wrapper blank about said mandrel and for clamping said wrapper blank to said moulding surface, said wrapper blank being of a length and width such that, when wrapped, its ends are in overlapping relation with one of said strips of adhesive interposed therebetween and it extends beyond each of the opposite ends of said mandrel; means for moving said mandrel end-surface axially of said mandrel to move said bottom blank out of said end recess axially of said wrapper blank into a sealing position wherein said inclined rim portion is in close-fitting circumferential engagement with the wrapper blank; means for applying heat to said wrapper blank along the over-lapping ends thereof to activate the interposed adhesive strip and bond the opposing faces of said wrapper blank to each other along said overlap; a multiple die unit mounted for movement axially of said mandrel into telescoping engagement with one end of said wrapper blank, said die unit including an expansible piston for folding the extending portion of said wrapper blank against said inclined rim portion and having heating means for sealing said extending portion, when folded, to said rim portion; and, rim-spinning means for forming a rim bead on the opposite end of said wrapper blank, said rim-spinning means comprising a first sleeve concentric with said mandrel and mounted for movement coaxially thereof, a roller sleeve carried by and concentric with said first sleeve and mounted for rotation thereon on the common axis, a first set of spinning rollers carried by said roller sleeve and riding on said first sleeve so as to be frictionally driven thereby, a second set of spinning rollers carried by said roller sleeve and mounted for tilting movement thereon toward and away from said first set of rollers to provide a variable surface spinning recess therebetween, means for tilting said second set of rollers, means for rotating said roller sleeve on said common axis, and means for axially moving said first sleeve toward and away from said mandrel, whereby the cup rim end of said wrapper blank may be received in, beaded, and then withdrawn from said spinning recess.

References Cited in the file of this patent

UNITED STATES PATENTS

| | | |
|---|---|---|
| 1,124,517 | Provandie | Jan. 12, 1915 |
| 1,876,931 | Heywood et al. | Sept. 13, 1932 |
| 1,892,675 | Lyon et al. | Jan. 3, 1933 |